(12) United States Patent
Eyman

(10) Patent No.: US 9,962,011 B1
(45) Date of Patent: May 8, 2018

(54) RECLINE ASSEMBLIES FOR STROLLER SEATS

(71) Applicant: Kolcraft Enterprises, Inc., Chicago, IL (US)

(72) Inventor: Mark Eyman, Chicago, IL (US)

(73) Assignee: KOLCRAFT ENTERPRISES, INC., Chicago, IL (US)

( * ) Notice: Subject to any disclaimer, the term of this patent is extended or adjusted under 35 U.S.C. 154(b) by 0 days. days.

(21) Appl. No.: 15/417,886

(22) Filed: Jan. 27, 2017

(51) Int. Cl.
| | |
|---|---|
| *A47D 1/02* | (2006.01) |
| *A47D 1/00* | (2006.01) |
| *A47D 15/00* | (2006.01) |
| *B62B 9/10* | (2006.01) |
| *B60N 2/20* | (2006.01) |
| *B60N 2/68* | (2006.01) |
| *B60N 3/06* | (2006.01) |
| *B62B 9/12* | (2006.01) |
| *B62B 9/14* | (2006.01) |

(52) U.S. Cl.
CPC ............ *A47D 1/002* (2013.01); *A47D 1/02* (2013.01); *A47D 15/006* (2013.01); *B60N 2/20* (2013.01); *B60N 2/68* (2013.01); *B60N 3/063* (2013.01); *B62B 9/104* (2013.01); *B62B 9/12* (2013.01); *B62B 9/142* (2013.01)

(58) Field of Classification Search
CPC .................................. B60N 2/20; A47D 1/02
USPC .. 297/16.1, 16.2, 17, 354.12, 487, 148–156, 297/354.1, 354.13; 280/642, 648, 649, 280/650
See application file for complete search history.

(56) References Cited

U.S. PATENT DOCUMENTS

| | | | | |
|---|---|---|---|---|
| 5,257,799 | A * | 11/1993 | Cone | B62B 5/04 280/47.36 |
| 5,558,405 | A * | 9/1996 | Ishikura | B62B 9/245 280/38 |
| 5,947,555 | A * | 9/1999 | Welsh, Jr. | B62B 7/142 280/30 |
| 6,478,327 | B1 | 11/2002 | Hartenstine et al. | |
| 6,513,827 | B1 | 2/2003 | Barenbrug | |
| 6,666,473 | B2 | 12/2003 | Hartenstine et al. | |
| 6,851,700 | B2 | 2/2005 | Yoshie et al. | |
| 7,044,497 | B2 | 5/2006 | Hartenstine et al. | |
| 7,278,652 | B2 | 10/2007 | Riedl et al. | |
| 7,367,580 | B2 * | 5/2008 | Iwata | B62B 7/08 280/47.38 |
| 7,377,537 | B2 | 5/2008 | Li | |
| 7,387,340 | B2 * | 6/2008 | Wilkening | B60N 2/22 297/354.12 |
| 7,600,775 | B2 * | 10/2009 | Chen | B62B 7/14 280/642 |
| 7,686,322 | B2 | 3/2010 | Longenecker et al. | |
| 7,798,500 | B2 | 9/2010 | Den Boer | |

(Continued)

*Primary Examiner* — Rodney B White
(74) *Attorney, Agent, or Firm* — Hanley, Flight & Zimmerman, LLC

(57) ABSTRACT

Recline assemblies for stroller seats are disclosed. In some examples, a recline assembly for a stroller seat includes a seat base, a seat back connector rotatably coupled to the seat base, and a napper bar connector rotatably coupled to the seat base. In some examples, the napper bar connector is releasable from a locked position in response to rotation of the seat back connector relative to the seat base. In some examples, the napper bar connector is rotatable relative to the seat base in response to being released from the locked position.

20 Claims, 25 Drawing Sheets

(56) References Cited

U.S. PATENT DOCUMENTS

| | | | |
|---|---|---|---|
| 8,092,111 B2 | 1/2012 | Wu | |
| 8,100,429 B2 | 1/2012 | Longenecker et al. | |
| 8,186,705 B2 | 5/2012 | Greger et al. | |
| 8,240,700 B2 | 8/2012 | Greger et al. | |
| 8,251,382 B2 | 8/2012 | Chen et al. | |
| 8,276,935 B2 | 10/2012 | Minato et al. | |
| 8,282,120 B2 | 10/2012 | Minato et al. | |
| 8,322,744 B2 | 12/2012 | Ahnert et al. | |
| 8,366,127 B2 | 2/2013 | Zhong et al. | |
| 8,376,375 B2* | 2/2013 | Mival | B62B 7/08 280/47.25 |
| 8,382,127 B2 | 2/2013 | Longenecker et al. | |
| 8,567,866 B2* | 10/2013 | Carimati Di Carimate | A47D 1/008 297/184.13 |
| 8,616,638 B2 | 12/2013 | Zeng et al. | |
| 8,764,048 B1 | 7/2014 | Ahnert et al. | |
| 8,777,253 B2 | 7/2014 | Minato et al. | |
| 8,888,124 B2* | 11/2014 | Iftinca | B62B 7/142 280/47.38 |
| 8,950,761 B2* | 2/2015 | Chen | B62B 7/08 280/47.36 |
| 9,050,993 B2* | 6/2015 | Pollack | B62B 9/12 |
| 9,139,215 B2* | 9/2015 | Zhu | B62B 7/006 |
| 9,399,477 B2* | 7/2016 | Iftinca | B62B 7/06 |
| 2001/0040357 A1* | 11/2001 | Barrett | B62B 7/08 280/648 |
| 2003/0094791 A1 | 5/2003 | Hartenstine et al. | |
| 2003/0098604 A1* | 5/2003 | Lan | B62B 7/123 297/487 |
| 2004/0090046 A1 | 5/2004 | Hartenstine et al. | |
| 2006/0131840 A1* | 6/2006 | Donay | B62B 7/123 280/642 |
| 2008/0169697 A1* | 7/2008 | Chen | A47D 15/006 297/487 |
| 2009/0315299 A1 | 12/2009 | Barenbrug | |
| 2013/0140797 A1* | 6/2013 | Fritz | B62B 7/08 280/649 |
| 2015/0291200 A1 | 10/2015 | Taylor et al. | |
| 2016/0046314 A1 | 2/2016 | Zehfuss et al. | |

\* cited by examiner

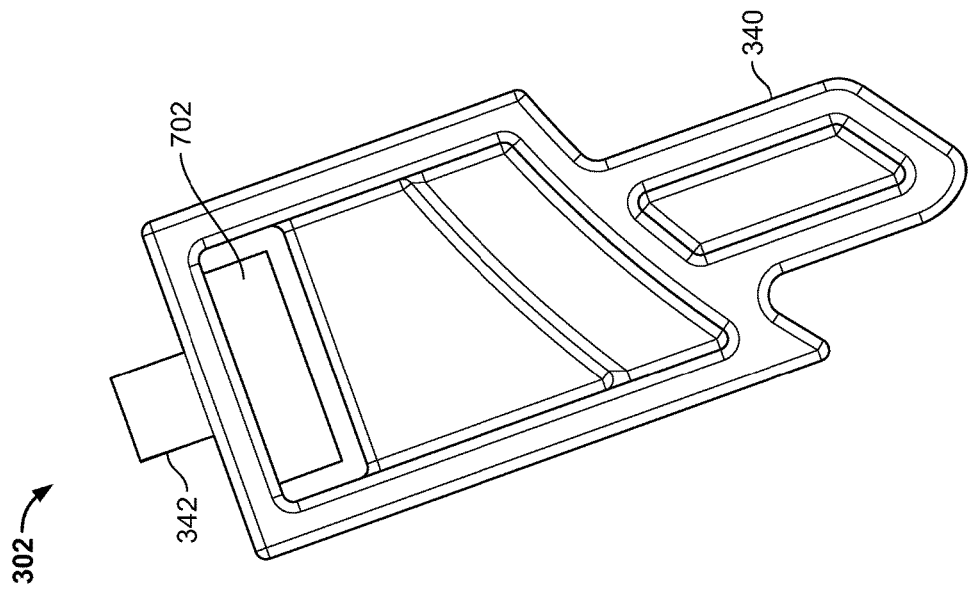
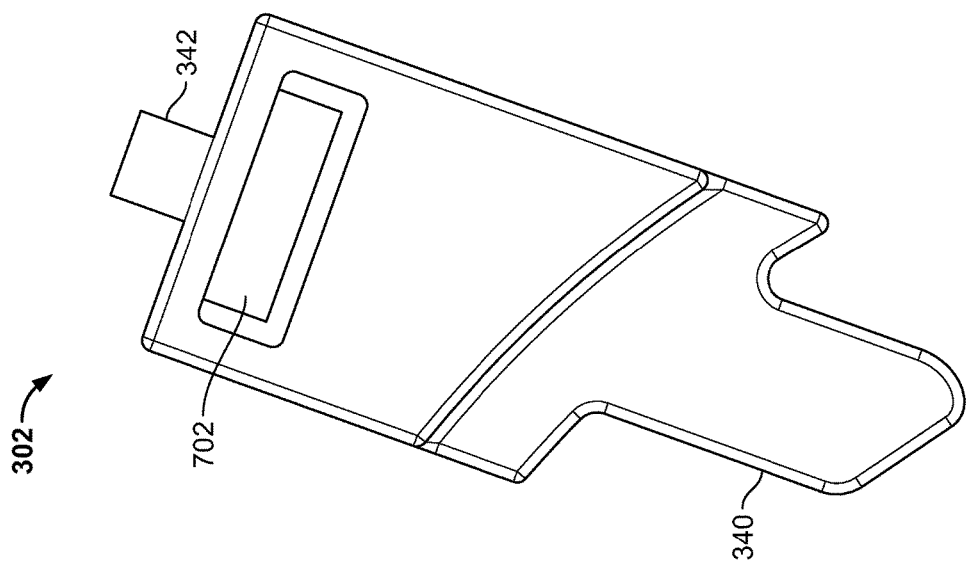

RECLINE ASSEMBLIES FOR STROLLER SEATS

FIELD OF THE DISCLOSURE

This disclosure relates generally to recline assemblies and, more specifically, to recline assemblies for stroller seats.

BACKGROUND

Conventional stroller seats commonly include one or more recline mechanism(s) that enable(s) a seat back (e.g., a backrest) of the stroller seat to be reclined relative to a seat base of the stroller seat. In some examples, the recline mechanism is configured to selectively lock the seat back in one of a plurality of available locking positions corresponding to different degrees of recline of the seat back relative to the seat base of the stroller seat.

BRIEF DESCRIPTION OF THE DRAWINGS

FIG. 7A is an exterior side view of the example recline lock pin of FIGS. 3 and 4.

FIG. 7B is an interior side view of the example recline lock pin of FIGS. 3, 4 and 7A.

Figure 1:
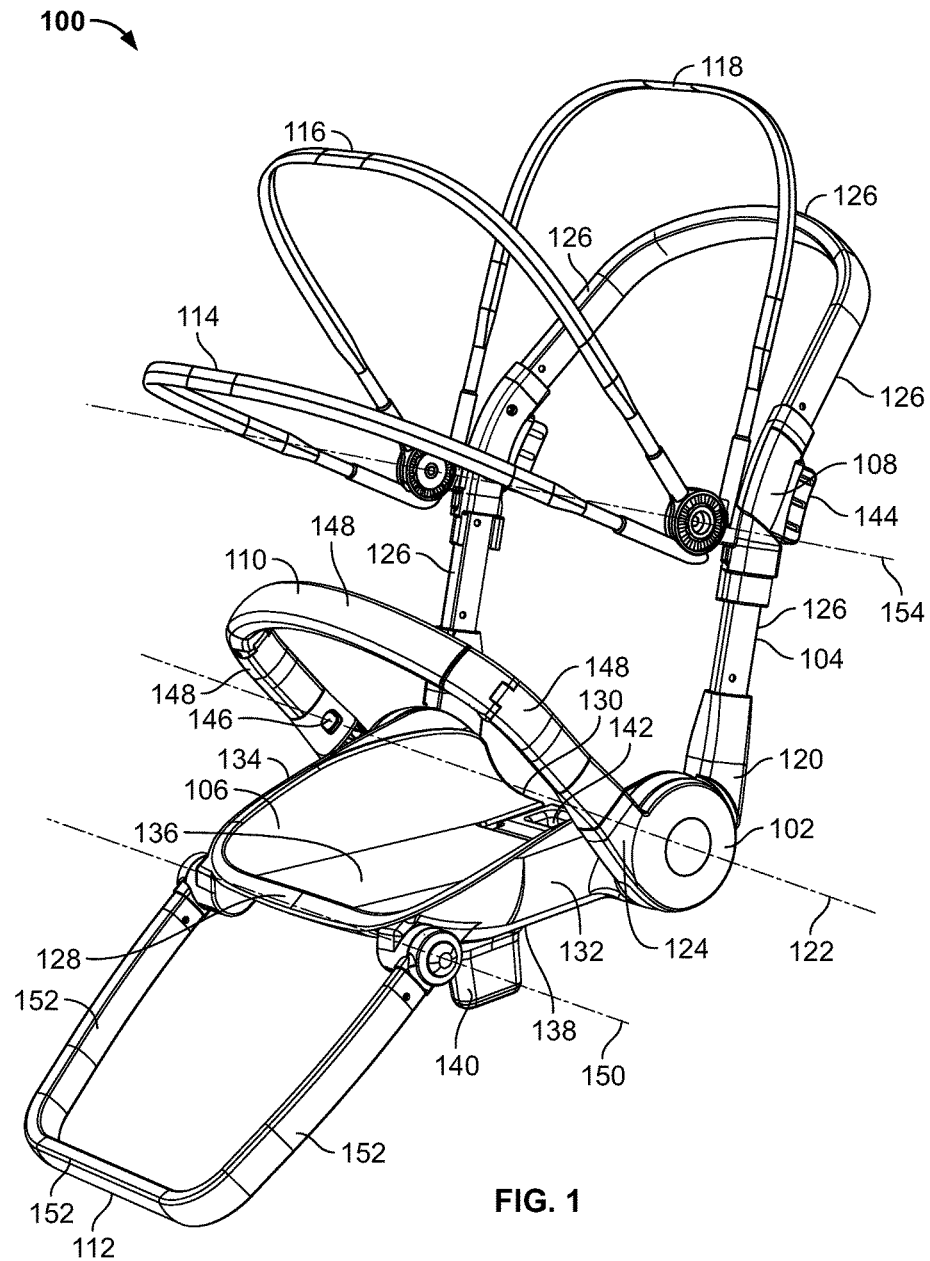
FIG. 1 is a perspective view of an example stroller seat including an example recline assembly.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional stroller seats commonly include one or more recline mechanism(s) that enable(s) a seat back (e.g., a backrest) of the stroller seat to be reclined relative to a seat base of the stroller seat. Some conventional stroller seats may additionally include a napper bar. In such conventional stroller seats, the position of the napper bar is either fixed relative to the stroller seat or, in some instances, moveable relative to the stroller seat via a mechanism that is independent from the recline mechanism of the stroller seat. The ability to fold the stroller seat into a compact structure is limited when the position of the napper bar is fixed relative to the stroller seat, as the napper bar typically obstructs and/or blocks the seat back from being fully rotated toward the seat base of the stroller seat. While the ability to fold the stroller seat into a compact structure may increase when the napper bar is movable relative to the stroller seat, the use of separate mechanisms for rotating the napper bar and the seat back toward the seat base is inconvenient and time consuming for the operator of the stroller seat.

Unlike the conventional stroller seats described above having napper bars that are fixed relative to the seat base, or napper bars that are movable relative to the seat base only by way of mechanisms independent from a recline mechanism that enables movement of a seat back of the stroller seat relative to the seat base, the stroller seats disclosed herein include recline assemblies that enable rotation of a seat back as well as a napper bar toward a seat base of the stroller seat. Example recline assemblies disclosed herein include a seat base, a seat back connector rotatably coupled to the seat base, and a napper bar connector rotatably coupled to the seat base. In some disclosed examples, the napper bar connector is releasable from a locked position in response to rotation of the seat back connector relative to the seat base.

In some disclosed examples, the napper bar connector is rotatable relative to the seat base in response to being released from the locked position.

Implementation of the disclosed recline assemblies enables a stroller seat to be folded into a compact structure without an operator of the stroller seat having to separately actuate independent mechanisms to rotate the seat back and the napper bar of the stroller seat into a folded position. Accordingly, the disclosed recline assemblies advantageously simplify the process of folding a stroller seat having a seat back and a napper bar. The disclosed recline assemblies also advantageously reduce the time that would otherwise be consumed by the operator having to separately actuate independent mechanisms to rotate the seat back and the napper bar of the stroller seat into a folded position.

FIG. 1 is a perspective view of an example stroller seat 100 including an example recline assembly 102 constructed in accordance with the teachings of this disclosure. In the illustrated example of FIG. 1, the stroller seat 100 further includes an example seat back 104, an example seat base 106, an example actuation assembly 108, an example napper bar 110, an example footrest 112, and first, second and third example canopy frame members 114, 116, 118. Although the description provided herein is generally directed to the example recline assembly 102 located on a first lateral side of the seat base 106 of the stroller seat 100 of FIG. 1, the interested reader would understand that a structurally similar recline assembly (e.g., a recline assembly that mirrors the example recline assembly 102 of FIG. 1) may be located on a second lateral side of the seat base 106 opposite the first lateral side. Thus, the stroller seat 100 may include more than one of certain of the structural components described herein based on the number of recline assemblies implemented in and/or on the stroller seat 100.

The example recline assembly 102 of FIG. 1 includes an example seat back connector 120. The seat back connector 120 is rigidly coupled (e.g., via one or more mechanical fastener(s) such as a screw, a bolt, a rivet, a pin, a clip, etc.) to the seat back 104 of the stroller seat 100 and rotatably coupled (e.g., via one or more mechanical fastener(s) such as a bolt, a rivet, a pin, a clip, etc.) to the seat base 106 of the stroller seat 100 such that the seat back connector 120 and/or the seat back 104 is/are rotatable relative to the seat base 106 about a first example axis of rotation 122. Based on the seat back 104 being rigidly coupled to the seat back connector 120, a rotation of the seat back connector 120 about the first axis of rotation 122 provides a corresponding rotation of the seat back 104 about the first axis of rotation 122. As further described below in connection with FIGS. 3-5, 6A, 6B, 7A, 7B and 12-25, the seat back connector 120 is rotatable relative to the seat base 106 about the first axis of rotation 122 when a recline lock pin (shown in FIGS. 3, 4, 7A, 7B and 14-25) slidably positioned within a recline lock pin track (shown in FIGS. 6B and 12-25) of the seat back connector 120 is disengaged from a plurality of lock positions of an outer lock position ring (shown in FIGS. 3-5 and 12-25) of the seat base 106 to which the seat back connector 120 is rotatably coupled.

The example recline assembly 102 of FIG. 1 also includes an example napper bar connector 124. The napper bar connector 124 is detachably coupled (e.g., via one or more actuatable mechanical fastener(s) such as a spring-loaded button that is selectively receivable in an aperture) in a rigid manner to the napper bar 110 of the stroller seat 100, and rotatably coupled (e.g., via one or more mechanical fastener(s) such as a bolt, a rivet, a pin, a clip, etc.) to the seat base 106 of the stroller seat 100 such that the napper bar connector 124 and/or the napper bar 110 is/are rotatable relative to the seat base 106 about the first example axis of rotation 122. When the napper bar 110 is coupled to the napper bar connector 124, a rotation of the napper bar connector 124 about the first axis of rotation 122 provides a corresponding rotation of the napper bar 110 about the first axis of rotation 122. As further described below in connection with FIGS. 3-5, 10A, 10B, 11A, 11B and 12-25, the napper bar connector 124 is rotatable relative to the seat base 106 about the first axis of rotation 122 when a napper bar lock pin (shown in FIGS. 3, 4, 11A, 11B and 12-25) positioned within a napper bar lock pin track (shown in FIGS. 10B and 12-25) of the napper bar connector 124 is disengaged from a lock position of an inner lock position ring (shown in FIGS. 3-5 and 12-25) of the seat base 106 to which the napper bar connector 124 is rotatably coupled.

The example seat back 104 of FIG. 1 is rigidly coupled (e.g., via one or more mechanical fastener(s) such as a screw, a bolt, a rivet, a pin, a clip, etc.) to one or more seat back connector(s) of corresponding ones of the recline assemblies of the stroller seat 100 (e.g., the seat back connector 120 of the recline assembly 102 of FIG. 1). The seat back 104 is shaped and/or configured to support the back and/or head of a child (e.g., an infant, a toddler, a preschooler, etc.) seated on the seat base 106 of the stroller seat 100. The seat back 104 of FIG. 1 includes one or more example seat back frame member(s) 126. In the illustrated example of FIG. 1, the seat back frame member(s) 126 is/are formed by tubing (e.g., hollow tubing). The seat back frame member(s) 126 may be implemented as any number of hollow and/or solid-core tube(s), strut(s), bar(s), rod(s), shaft(s), plate(s), linkage(s), etc. In some examples, one or more of the seat back frame member(s) 126 may be slidable and/or extendable relative to one or more other ones of the seat back frame member(s) 126 to adjust an extent of the distance to which the seat back 104 extends away from the seat base 106 of the stroller seat 100. In some examples, a backrest surface material (e.g., a mesh fabric, a rigid plastic, etc.) may be mounted to one or more of the seat back frame members 126 to form a backrest (not shown) to support the back and/or head of a child seated on the seat base 106 of the stroller seat 100.

The example seat base 106 of FIG. 1 includes an example front end 128, an example rear end 130 opposite the front end 128, a first example lateral side 132, a second example lateral side 134 opposite the first lateral side 132, an example top side 136, an example bottom side 138 opposite the top side 136, an example stroller base connector 140, and an example seat removal handle 142. In the illustrated example of FIG. 1, the seat back connector 120 and the napper bar connector 124 of the recline assembly 102 are rotatably coupled to the first lateral side 132 of the seat base 106 proximate the rear end 130 of the seat base 106. A second seat back connector and a second napper bar connector of a second recline assembly may be rotatably coupled to the second lateral side 134 of the seat base 106 proximate the rear end 130 of the seat base 106.

The example seat base 106 of FIG. 1 is shaped and/or configured to support the buttocks and upper legs of a child (e.g., an infant, a toddler, a preschooler, etc.) seated on the top side 136 of the seat base 106 of the stroller seat 100. The seat base 106 may be formed from one or more seat base frame member(s) (e.g., a seat pan) that may be implemented as any number of hollow and/or solid-core tube(s), strut(s), bar(s), rod(s), shaft(s), plate(s), linkage(s), etc. In some examples, a seat cover material (e.g., a mesh fabric, etc.) may be mounted to the seat base 106 to cover and/or cushion the top side 136 of the seat base 106 of the stroller seat 10X).

In the illustrated example of FIG. 1, the stroller base connector 140 is located on the bottom side 138 of the seat base 106, and the seat removal handle 142 is located proximate the rear end 130 of the seat base 106 between the first and second lateral sides 132, 134 of the seat base 106. As further described in U.S. Provisional Patent Application Ser. No. 62/367,421 entitled "Foldable Strollers with Removable Seats and Related Methods" filed on Jul. 27, 2016, the stroller base connector 140 of the seat base 106 of FIG. 1 is detachably couplable to a stroller base (not shown) such that the seat base 106 and/or, more generally, the stroller seat 100 of FIG. 1, is removable from the stroller base in response to actuation of the seat removal handle 142. The entirety of U.S. Provisional Patent Application Ser. No. 62/367,421 is incorporated herein by reference. The example seat base 106 of FIG. 1 is further described below in connection with FIGS. 3-5 and 12-25.

The example actuation assembly 108 of FIG. 1 is rigidly coupled (e.g., via one or more mechanical fastener(s) such as a screw, a bolt, a rivet, a pin, a clip, etc.) to one or more of the seat back frame members 126 of the seat back 104 and operatively coupled to a recline cable (shown in FIGS. 3, 8, 9 and 12-25) of the recline assembly 102. The actuation assembly 108 of FIG. 1 includes an example lever 144 that is movable and/or actuatable from a first position to a second position and vice-versa. In the illustrated example of FIG. 1, rotation of the seat back connector 120 and/or the seat back 104 relative to the seat base 106 is enabled in part by actuating the lever 144 of the actuation assembly 108 of the stroller seat 100 (e.g., by moving and/or adjusting the lever 144 of the actuation assembly 108 from a first position to a second position). The example actuation assembly 108 of FIG. 1 is further described below in connection with FIGS. 8 and 9.

The example napper bar 110 of FIG. 1 is detachably coupled in a rigid manner to one or more napper bar connector(s) of corresponding ones of the recline assemblies of the stroller seat 100 (e.g., the napper bar connector 124 of the recline assembly 102 of FIG. 1). In the illustrated example of FIG. 1, the detachable coupling(s) is/are implemented via corresponding ones of an example napper bar attachment mechanism 146. In some examples, the napper bar attachment mechanism 146 may be implemented via a spring-loaded button coupled to the napper bar connector 124 that is receivable within an aperture formed in the napper bar 110. In other examples, the napper bar attachment mechanism 146 may be implemented via a spring-loaded button coupled to napper bar 110 that is receivable within an aperture formed in the napper bar connector 124.

The example napper bar 110 of FIG. 1 is shaped and/or configured to provide a barrier that may reduce the ability of (e.g., prevent) a child (e.g., an infant, a toddler, a preschooler, etc.) seated on the seat base 106 of the stroller seat 100 from leaving the stroller seat 100. The napper bar 110 of FIG. 1 includes one or more example napper bar frame member(s) 148. In the illustrated example of FIG. 1, the napper bar frame member(s) 148 is/are formed by tubing (e.g., hollow tubing). The napper bar frame member(s) 148 may be implemented as any number of hollow and/or solid-core tube(s), strut(s), bar(s), rod(s), shaft(s), plate(s), linkage(s), etc. In some examples, one or more of the napper bar frame member(s) 148 may be slidable and/or extendable relative to one or more other ones of the napper bar frame member(s) 148 to adjust an extent of the distance to which the napper bar 110 extends away from the seat base 106 of the stroller seat 100.

The example footrest 112 of FIG. 1 is rotatably coupled (e.g., via one or more mechanical fastener(s) such as a bolt, a rivet, a pin, a clip, etc.) to the seat base 106 of the stroller seat 100 proximate the front end 128 of the seat base 106 such that the footrest 112 is rotatable relative to the seat base 106 about a second example axis of rotation 150. The footrest 112 is shaped and/or configured to support the feet and/or the legs of a child (e.g., an infant, a toddler, a preschooler, etc.) seated on the seat base 106 of the stroller seat 100. The footrest 112 of FIG. 1 includes one or more example footrest frame member(s) 152. In the illustrated example of FIG. 1, the footrest frame member(s) 152 is/are formed by tubing (e.g., hollow tubing). The footrest frame member(s) 152 may be implemented as any number of hollow and/or solid-core tube(s), strut(s), bar(s), rod(s), shaft(s), plate(s), linkage(s), etc. In some examples, one or more of the footrest frame member(s) 152 may be slidable and/or extendable relative to one or more other ones of the footrest frame member(s) 152 to adjust an extent of the distance to which the footrest 112 extends away from the seat base 106 of the stroller seat 100. In some examples, a leg rest surface material (e.g., a mesh fabric, a rigid plastic, etc.) may be mounted to one or more of the footrest frame members 152 to form a leg rest (not shown) to support the legs of a child seated on the seat base 106 of the stroller seat 100.

In the illustrated example of FIG. 1, respective ones of the first, second and third example canopy frame members 114, 116, 118 are rotatably coupled (e.g., via one or more mechanical fastener(s) such as a bolt, a rivet, a pin, a clip, etc.) to the seat back 104 of the stroller seat 100 such that the first, second and third example canopy frame members 114, 116, 118 are rotatable relative to the seat back 104 about a third example axis of rotation 154. In the illustrated example of FIG. 1, the first, second and third canopy frame members 114, 116, 118 are formed by tubing (e.g., hollow tubing). The first, second and third canopy frame members 114, 116, 118 may be implemented as any number of hollow and/or solid-core tube(s), strut(s), bar(s), rod(s), shaft(s), plate(s), linkage(s), etc. In some examples, a canopy surface material (e.g., a mesh fabric, etc.) may be mounted to the first, second and third canopy frame members 114, 116, 118 to form a canopy (not shown) to cover a portion (e.g., a head) of a child (e.g., an infant, a toddler, a preschooler, etc.) seated on the seat base 106 of the stroller seat 100.

Figure 2:
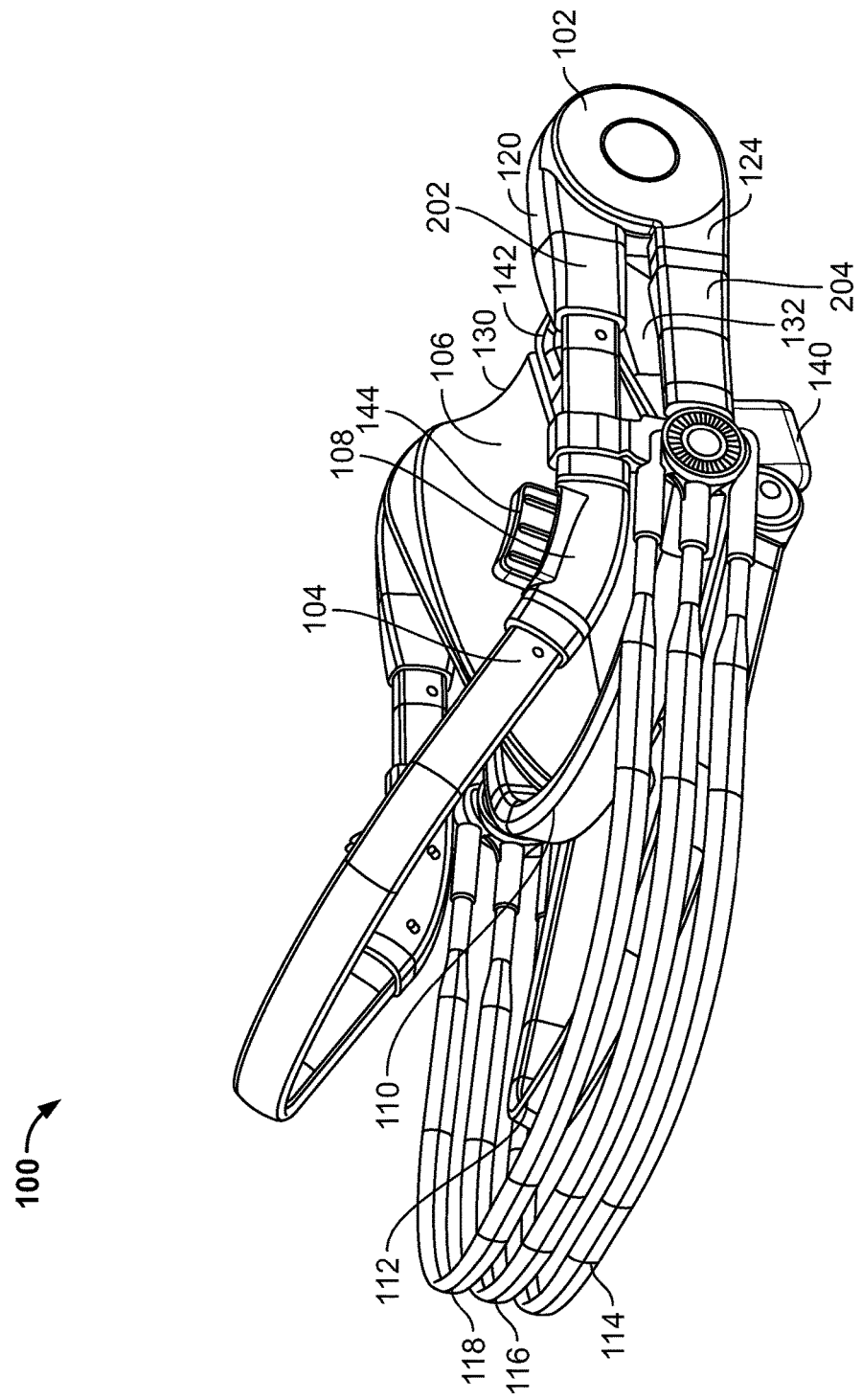
FIG. 2 is a perspective view of the example stroller seat of FIG. 1 in an example folded position.

FIG. 1 provides a perspective view of the stroller seat 100 in an example unfolded position (e.g., a use position). In some examples, when the stroller seat 100 is in an unfolded position (e.g., as shown in FIG. 1), the recline assembly 102 of FIG. 1 enables the seat back 104 to be selectively reclined to one of a plurality of available locking positions of the seat base 106 corresponding to different degrees of recline (e.g., one hundred degrees (100°), one hundred twenty-two and a half degrees (122.5°), one hundred forty-five degrees (145®), etc.) of the seat back 104 relative to the seat base 106 of the stroller seat 100. FIG. 2 is a perspective view of the example stroller seat 100 of FIG. 1 in an example folded position. As further described below in connection with FIGS. 12-25, the stroller seat 100 may be moved, collapsed, folded and/or transformed from the unfolded position of FIG. 1 to the folded position of FIG. 2 by rotating the seat back connector 120 and the napper bar connector 124 of the recline assembly 102 toward the front end 128 of the seat base 106 of the stroller seat 100. In some examples, when the stroller seat 100 is in a folded position (e.g., as shown in FIG. 2), an example arm portion 202 of the seat back connector 120 coupled to the seat back 104 extends in a direction that is generally parallel to a direction in which an example arm portion 204 of the napper bar connector 124 coupled to the napper bar 110 of the stroller seat 100 extends. In some such examples, one or more of the napper bar 110 and/or the first, second and/or third canopy frame members 114, 116, 118 extends in a direction that is generally parallel to the direction in which the arm portion 204 of the napper bar connector 124 coupled to the napper bar 110 of the stroller seat 100 extends.

Figure 3:
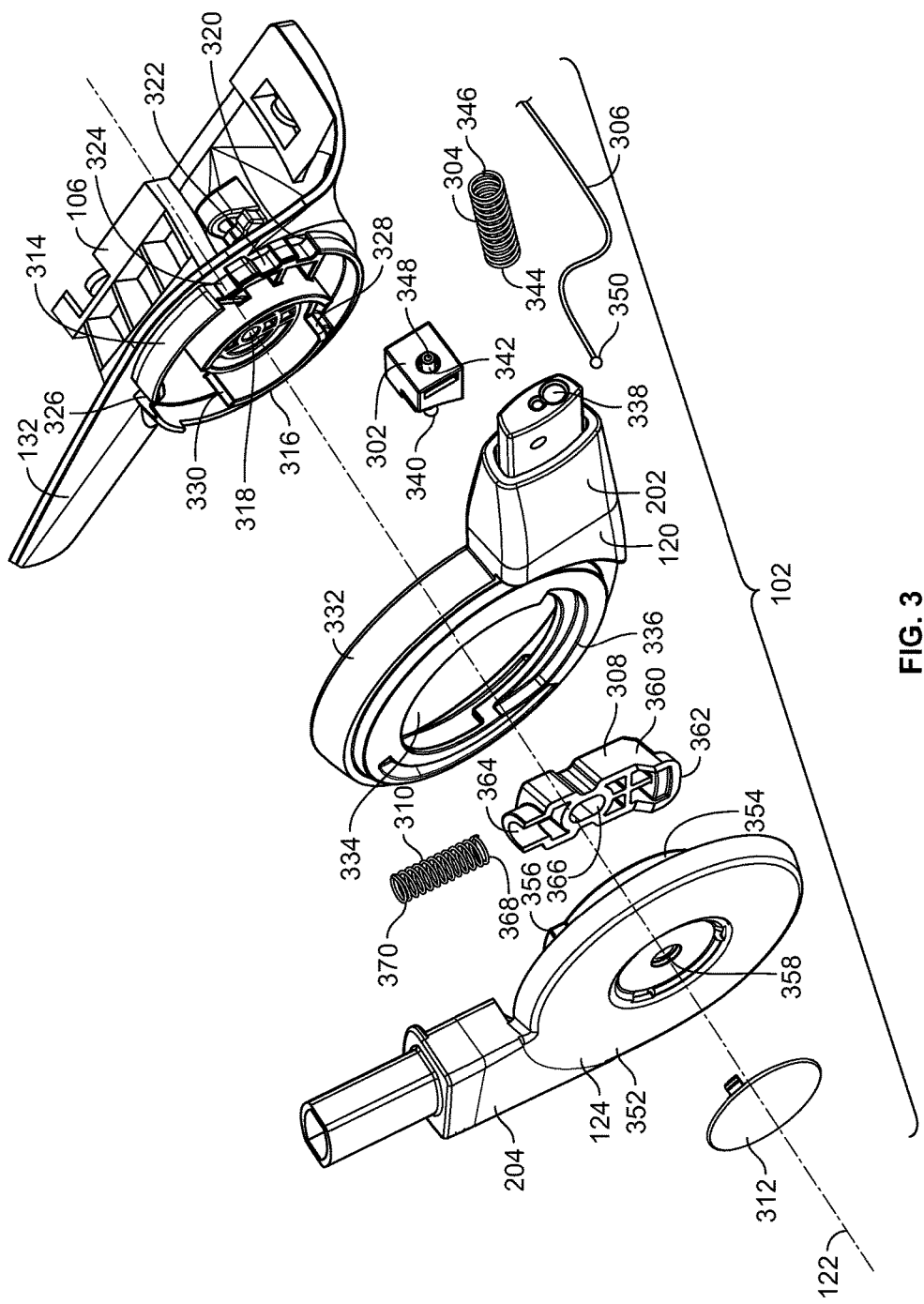
FIG. 3 is an exploded view of the example recline assembly of FIGS. 1 and 2.

FIG. 3 is an exploded view of the example recline assembly 102 of FIGS. 1 and 2. In the illustrated example of FIG. 3, the recline assembly 102 includes the seat base 106, the seat back connector 120, and the napper bar connector 124 described above in connection with FIGS. 1 and 2. In the illustrated example of FIG. 3, the recline assembly 102 further includes an example recline lock pin 302, an example recline lock spring 304, an example recline cable 306, an example napper bar lock pin 308, an example napper bar lock spring 310, and an example decorative cover 312.

In the illustrated example of FIG. 3, the seat base 106 includes an example outer lock position ring 314, an example inner lock position ring 316, and an example central bore 318. The outer lock position ring 314 includes a plurality of lock positions formed as partial and/or complete gaps, breaks, openings, notches and/or indentations along the circumference of the outer lock position ring 314. Each lock position of the outer lock position ring 314 is shaped and/or configured to selectively receive and/or engage the recline lock pin 302 of FIG. 3. In the illustrated example of FIG. 3, the outer lock position ring 314 includes a first example lock position 320, a second example lock position 322, a third example lock position 324, and a fourth example lock position 326. The first, second and third example lock positions 320, 322, 324 of the outer lock position ring 314 correspond to recline positions of the seat back connector 120 that are selectable when the stroller seat 100 is in an unfolded position (e.g., a use position), as shown in FIG. 1. The fourth example lock position 326 of the outer lock position ring 314 corresponds to a folded position of the seat back connector 120 when the stroller seat 100 is in a folded position, as shown in FIG. 2. In some examples, the outer lock position ring 314 may include fewer or additional lock positions relative to the number of lock positions illustrated in FIG. 3.

The inner lock position ring 316 of the seat base 106 of FIG. 3 is located within the circumference of the outer lock position ring 314 and is positioned concentrically relative thereto. In the illustrated example of FIG. 3, the inner lock position ring 316 includes an example lock position 328 and an example guide ring tooth opening 330 formed as partial and/or complete gaps, breaks, openings and/or notches along the circumference of the inner lock position ring 316. The lock position 328 of the inner lock position ring 316 of FIG. 3 is shaped and/or configured to selectively receive and/or engage the napper bar lock pin 308 of FIG. 3. The guide ring tooth opening 330 is shaped and/or configured to receive a guide ring tooth 356 of a guide ring 354 of the napper bar connector 124 of FIG. 3. In some examples, the inner lock position ring 316 may include additional gaps, breaks, openings and/or notches relative to the lock position 328 and/or the guide ring tooth opening 330 illustrated in FIG. 3.

The central bore 318 of the seat base 106 of FIG. 3 is located within the circumference of the inner lock position ring 316 and is positioned concentrically relative thereto. In the illustrated example of FIG. 3, the central bore 318 of the seat base 106 defines and/or is aligned with the first axis of rotation 122 of FIG. 1. The central bore 318 of the seat base 106 is shaped and/or configured to receive a mechanical fastener (e.g., a screw, a bolt, a rivet, a pin, etc.) and/or a fastening sleeve through which a mechanical fastener may pass to couple one or more component(s) of the recline assembly 102 (e.g., the seat back connector 120, the napper bar connector 124, etc.) to the seat base 106.

In the illustrated example of FIG. 3, the seat back connector 120 includes the arm portion 202 described above in connection with FIG. 2 and further includes an example round portion 332. The seat back connector 120 is shaped and/or configured to be rotatably coupled to the seat base 106 such that the round portion 332 of the seat back connector 120 covers and/or surrounds the outer lock position ring 314 of the seat base 106 and rotates relative thereto. The round portion 332 of the seat back connector 120 includes an example opening 334 and an example cam surface 336. The opening 334 of the round portion 332 of the seat back connector 120 is shaped and/or configured to receive the guide ring 354 of the napper bar connector 124 as well as a mechanical fastener (e.g., a screw, a bolt, a rivet, a pin, etc.) and/or a fastening sleeve through which a mechanical fastener may pass to couple the seat back connector 120 and one or more other component(s) of the recline assembly 102 (e.g., the napper bar connector 124, etc.) to the seat base 106. As further described below in connection with FIGS. 6A, 11A, 11B and 12-25, the cam surface 336 of the round portion 332 of the seat back connector 120 is shaped and/or configured to guide a cam surface follower 362 of the napper bar lock pin 308 as the seat back connector 120 rotates relative to the napper bar connector 124.

In the illustrated example of FIG. 3, the arm portion 202 of the seat back connector 120 is shaped and/or configured to be rigidly coupled to the seat back 104 of the stroller seat 100 of FIG. 1. The arm portion 202 of the seat back connector 120 includes a recline lock pin track 612 (shown in FIGS. 6B and 12-25) that defines a slidable path of movement for the recline lock pin 302 of FIG. 3. The arm portion 202 of the seat back connector 120 further includes an example cable opening 338 shaped and/or configured to receive the recline cable 306 of FIG. 3.

In the illustrated example of FIG. 3, the recline lock pin 302 is shaped and/or configured to be received in the recline lock pin track 612 (shown in FIGS. 6B and 12-25) of the seat back connector 120. The recline lock pin 302 of FIG. 3 includes an example locking tooth 340 and an example stem 342. The locking tooth 340 of the recline lock pin 302 is shaped and/or configured to selectively engage and/or mate with one of the first, second, third and fourth example lock positions 320, 322, 324, 326 of the outer locking position ring 314 of the seat base 106 to lock the position of the seat back connector 120 relative to the seat base 106. The recline lock spring 304 of FIG. 3 includes an example first end 344 and an example second end 346. The stem 342 of the recline lock pin 302 is shaped and/or configured to be received within the first end 344 of the recline lock spring 304 to operatively couple the recline lock spring 304 to the recline lock pin 302. The second end 346 of the recline lock spring 304 is shaped and/or configured to contact an interior wall 618 (shown in FIGS. 6B and 12-25) of the seat back connector 120 such that the recline lock spring 304 biases the recline lock pin 302 in a first direction within the recline lock pin track 612 of the seat back connector 120. The stem 342 of the recline lock pin 302 further includes an example cable opening 348 shaped and/or configured to receive the recline cable 306 of FIG. 3.

The recline cable 306 of FIG. 3 includes an example first end 350 and a second end (not shown) opposite the first end 350. The first end 350 of the recline cable 306 is shaped and/or configured to be coupled to the recline lock pin 302. The recline cable 306 passes from within the recline lock pin 302, through the cable opening 348 formed in the stem 342 of the recline lock pin 302, through the recline lock spring 304, through the cable opening 338 formed in the arm portion 202 of the seat back connector 120, and through one or more of the seat back frame member(s) 126 of the seat back 104. The recline cable 306 is shaped and/or configured to be operatively coupled to the actuation assembly 108 of FIG. 1 that is rigidly coupled to one or more of the seat back frame member(s) 126 of the seat back 104. In some examples, the second end of the recline cable 306 is shaped and/or configured to be coupled to the actuation assembly 108 of FIG. 1. In other examples, the second end of the recline cable 306 is shaped and/or configured to be coupled to a second recline lock pin of a second recline assembly located on the second lateral side 134 of the seat base 106 of FIG. 1

In the illustrated example of FIG. 3, the napper bar connector 124 includes the arm portion 204 described above in connection with FIG. 2. The arm portion 204 of the napper bar connector 124 is shaped and/or configured to be detachably coupled in a rigid manner to the napper bar 110 of the stroller seat 100 of FIG. 1. In the illustrated example of FIG. 3, the napper bar connector further includes an example round portion 352. The round portion 352 of the napper bar connector 124 of FIG. 3 includes the example guide ring 354 having the example guide ring tooth 356. The napper bar connector 124 of FIG. 3 is shaped and/or configured to be rotatably coupled to the seat base 106 such that the guide ring 354 is located within the inner lock position ring 316 of the seat base 106 and rotates relative thereto. When the napper bar connector 124 is coupled to the seat base 106, the guide ring tooth 356 of the guide ring 354 extends into and/or through the guide ring tooth opening 330 of the inner lock position ring 316 of the seat base 106. In some examples, the round portion 352 of the napper bar connector 124 is shaped and/or configured to cover a portion of the seat back connector 120 of the recline assembly 102 and/or a portion of the inner lock position ring 316 of the seat base 106, and to rotate relative thereto.

In the illustrated example of FIG. 3, the round portion 352 of the napper bar connector 124 further includes a napper bar lock pin track 1002 (shown in FIGS. 10B and 12-25) that defines a slidable path of movement for the napper bar lock pin 308 of FIG. 3. The round portion 352 of the napper bar connector 124 further includes an example central bore 358. In the illustrated example of FIG. 3, the central bore 358 of the napper bar connector 124 defines and/or is aligned with the first axis of rotation 122 of FIG. 1. The central bore 358 of the napper bar connector 124 is shaped and/or configured to receive a mechanical fastener (e.g., a screw, a bolt, a rivet, a pin, etc.) and/or a fastening sleeve through which a mechanical fastener may pass to couple the napper bar connector 124 and one or more other component(s) of the recline assembly 102 (e.g., the seat back connector 120, etc.) to the seat base 106.

In the illustrated example of FIG. 3, the napper bar lock pin 308 is shaped and/or configured to be received in the napper bar lock pin track 1002 (shown in FIGS. 100B and 12-25) of the napper bar connector 124. The napper bar lock pin 308 of FIG. 3 includes an example locking portion 360, an example cam surface follower 362, an example spring area 364, and an example travel slot 366. The locking portion 360 of the napper bar lock pin 308 is shaped and/or configured to selectively pass into and/or through the lock position 328 of the inner locking position ring 316 of the seat base 106 to lock the position of the napper bar connector 124 relative to the seat base 106. The cam surface follower 362 extends from the locking portion 360 of the napper bar lock pin 308 and is shaped and/or configured to contact and/or to be guided by the cam surface 336 of the round portion 332 of the seat back connector 120 to control the position of the napper bar lock pin 308 within the napper bar lock pin track of the napper bar connector 124.

In the illustrated example of FIG. 3, the spring area 364 of the napper bar lock pin 308 is shaped and/or configured to receive an example first end 368 of the napper bar lock spring 310 to operatively couple the napper bar lock spring 310 to the napper bar lock pin 308. An example second end 370 of the napper bar lock spring 310 is shaped and/or configured to contact an interior wall 1006 (shown in FIGS. 10B and 12-25) of the napper bar connector 124 such that the napper bar lock spring 310 biases the napper bar lock pin 308 in a first direction within the napper bar lock pin track 1002 of the napper bar connector 124. The travel slot 366 of the napper bar lock pin 308 defines a range of motion of the napper bar lock pin 308 along the napper bar lock pin track 1002 of the napper bar connector 124. The travel slot 366 is shaped and/or configured to receive a mechanical fastener (e.g., a screw, a bolt, a rivet, a pin, etc.) and/or a fastening sleeve through which a mechanical fastener may pass to couple the napper bar lock pin 308 and one or more other component(s) of the recline assembly 102 (e.g., the seat back connector 120, the napper bar connector 124, etc.) to the seat base 106.

The decorative cover 312 of FIG. 3 may be coupled to the napper bar connector 124 to conceal the central bore 358 of the napper bar connector 124, and/or to conceal a mechanical fastener (e.g., a screw, a bolt, a rivet, a pin, etc.) and/or a fastening sleeve that may pass through the central bore 358 of the napper bar connector 124.

Figure 4:
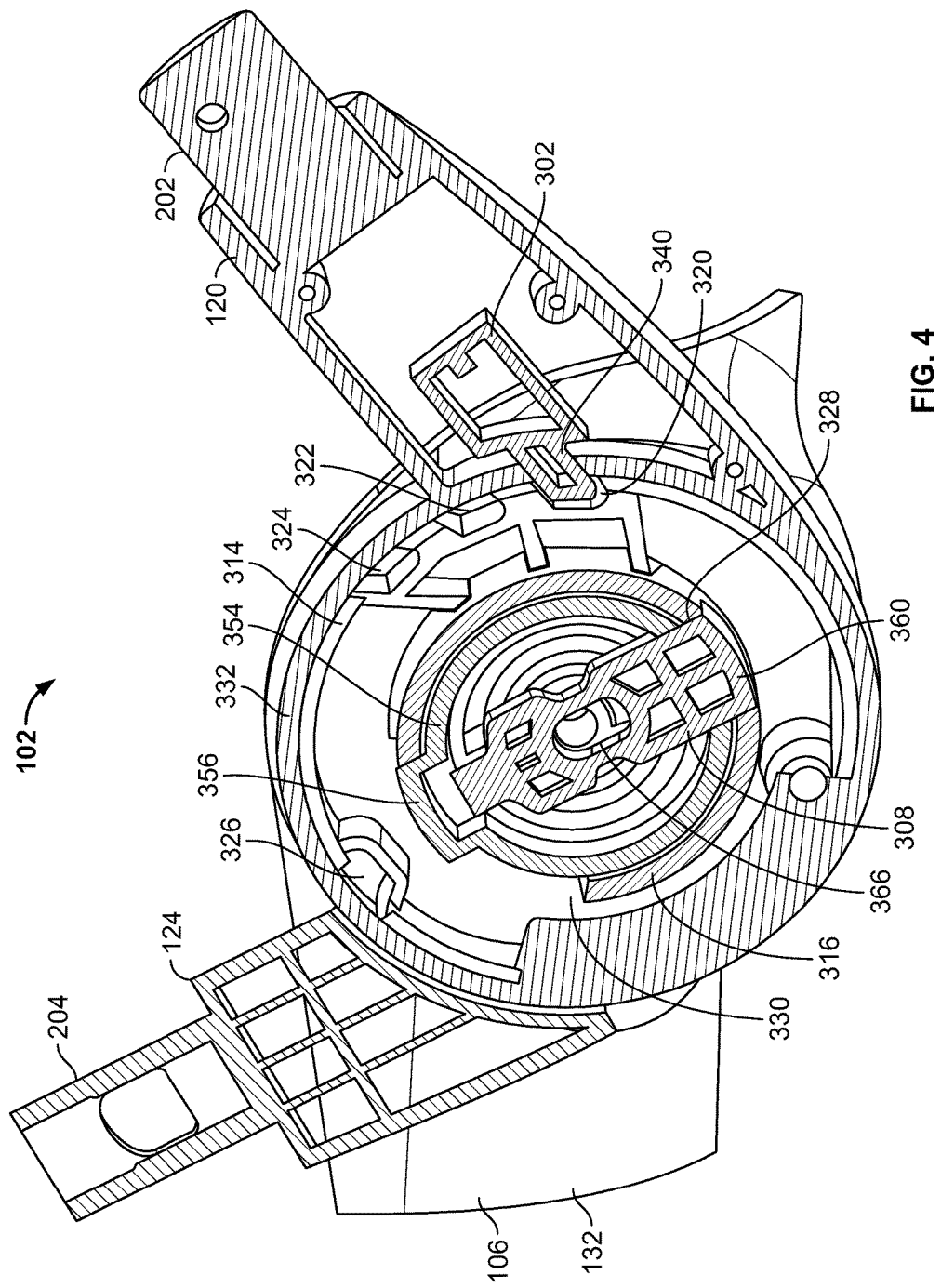
FIG. 4 is a partial cutaway view of the example recline assembly of FIGS. 1-3.

FIG. 4 is a partial cutaway view of the example recline assembly 102 of FIGS. 1-3. In the illustrated example of FIG. 4, the locking tooth 340 of the recline lock pin 302 is positioned in the first example lock position 320 of the outer lock position ring 314 of the seat base 106. When positioned as shown in FIG. 4, the recline lock pin 302 locks the seat back connector 120 relative to the seat base 106 such that the seat back connector 120 is unable to rotate relative to the seat base 106. As further shown in the illustrated example of FIG. 4, the locking portion 360 of the napper bar lock pin 308 is positioned in the example lock position 328 of the inner lock position ring 316 of the seat base 106. When positioned as shown in FIG. 4, the napper bar lock pin 308 locks the napper bar connector 124 relative to the seat base 106 such that the napper bar connector 124 is unable to rotate relative to the seat base 106.

Figure 5:
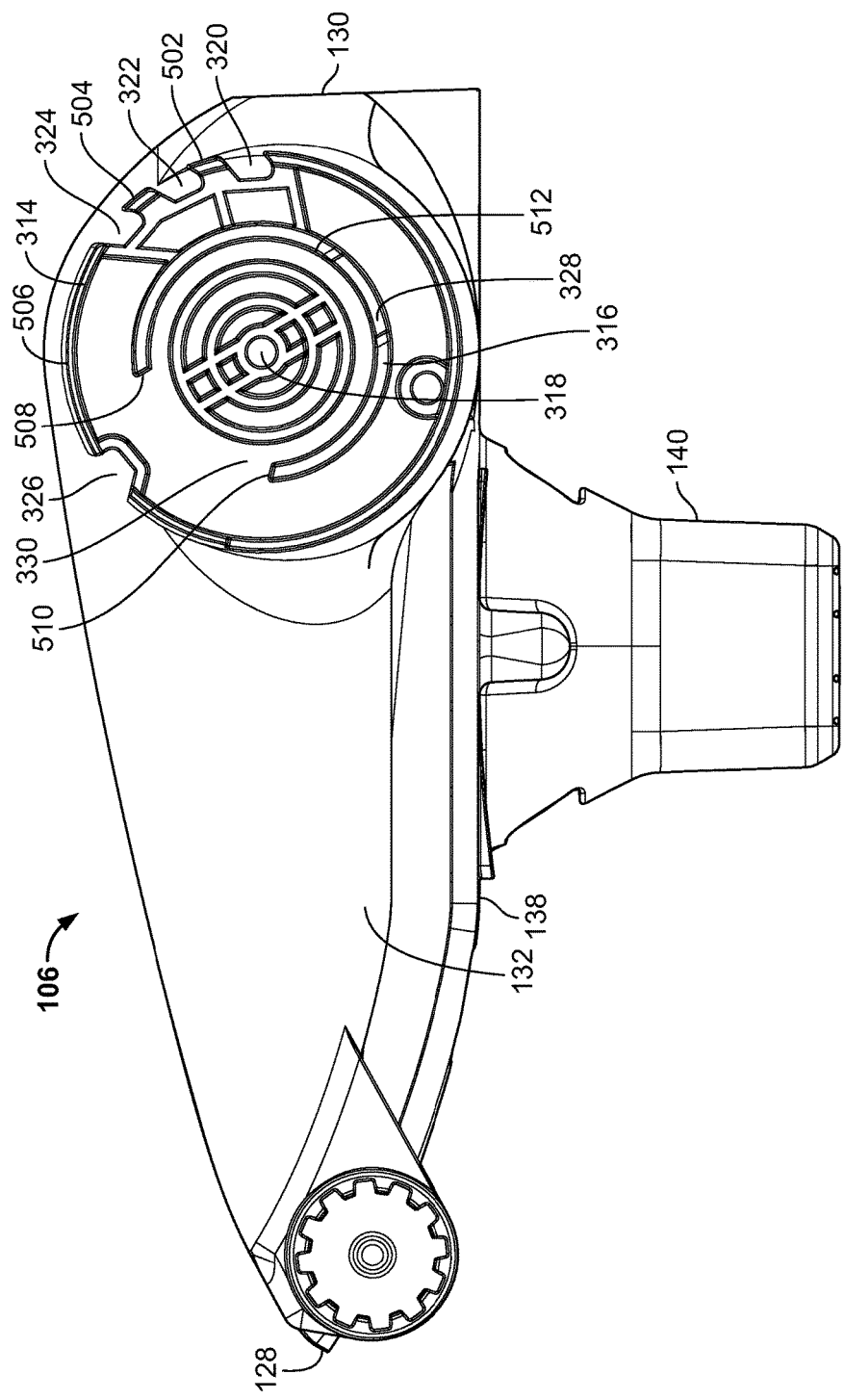
FIG. 5 is a side view of the example seat base of FIGS. 1-4.

FIG. 5 is a side view of the example seat base 106 of FIGS. 1-4. The seat base 106 of FIG. 5 includes the outer lock position ring 314, the inner lock position ring 316 and the central bore 318 described above in connection with FIGS. 3 and 4. In the illustrated example of FIG. 5, the outer lock position ring 314, the inner lock position ring 316, and the central bore 318 of the seat base 106 are integrally formed on the first lateral side 132 of the seat base 106. In other examples, one or more of the outer lock position ring 314 and/or the inner lock position ring 316 may be rigidly coupled to the first lateral side 132 of the seat base via one or more mechanical fastener(s) (e.g., a screw, a bolt, a rivet, a pin, a clip, etc.).

In the illustrated example of FIG. 5, each of the first, second, third and fourth lock positions 320, 322, 324, 326 of the outer lock position ring 314 of the seat base 106 is shaped and/or configured to selectively receive and/or engage the locking tooth 340 of the recline lock pin 302 of FIGS. 3 and 4. A first example portion 502 of the outer lock position ring 314 separates the first and second lock positions 320, 322 of the outer lock position ring 314. A second example portion 504 of the outer lock position ring 314 separates the second and third lock positions 322, 324 of the outer lock position ring 314. A third example portion 506 of the outer lock position ring 314 separates the third and fourth lock positions 324, 326 of the outer lock position ring 314. When the locking tooth 340 of the recline lock pin 302 contacts any one of the first, second or third portions 502, 504, 506 of the outer lock position ring 314, the first, second or third portion 502, 504, 506 of the outer lock position ring 314 forces and/or holds the recline lock pin 302 in a disengaged position.

In the illustrated example of FIG. 5, the first, second and third lock positions 320, 322, 324 of the outer lock position ring 314 correspond to recline positions of the seat back connector 120 that are selectable when the stroller seat 100 is in an unfolded position (e.g., a use position), as shown in FIGS. 1 and 4. For example, the first lock position 320 may correspond to a first recline position at which the arm portion 202 of the seat back connector 120 is positioned at an angle of approximately one hundred and forty-five degrees (145°) relative to the top side 136 of the seat base 106. The second lock position 322 may correspond to a second recline position at which the arm portion 202 of the seat back connector 120 is positioned at an angle of approximately one hundred twenty-two and one half degrees (122.5°) relative to the top side 136 of the seat base 106. The third lock position 324 may correspond to a third recline position at which the arm portion 202 of the seat back connector 120 is positioned at an angle of approximately one hundred degrees (100°) relative to the top side 136 of the seat base 106. The fourth lock position 326 of the outer lock position ring 314 corresponds to a folded position of the seat back connector 120 when the stroller seat 100 is in a folded position, as shown in FIG. 2. For example, the fourth lock position 326 may correspond to a folded position at which the arm portion 202 of the seat back connector 120 is positioned at an angle of approximately zero degrees (0°) relative to the arm portion 204 of the napper bar connector 124.

In the illustrated example of FIG. 5, the inner lock position ring 316 of the seat base 106 is located within the circumference of the outer lock position ring 314 and is positioned concentrically relative thereto. The lock position 328 of the inner lock position ring 316 is shaped and/or configured to selectively receive and/or engage the locking portion 360 of the napper bar lock pin 308 of FIGS. 3 and 4. The guide ring tooth opening 330 of the inner lock position ring 316 is shaped and/or configured to receive the guide ring tooth 356 of the guide ring 354 of the napper bar connector 124 of FIGS. 3 and 4. In the illustrated example of FIG. 5, the guide ring tooth opening 330 includes a first example end 508 and a second example end 510. When the locking portion 360 of the napper bar lock pin 308 is disengaged from the lock position 328 of the inner lock position ring 316, the guide ring tooth 356 is free to rotate between the first end 508 and the second end 510 of the guide ring tooth opening 330. As the guide ring tooth 356 rotates from the first end 508 of the guide ring tooth opening 330 toward the second end 510 of the guide ring tooth opening 330, the locking portion 360 of the napper bar lock pin 308 contacts a first example portion 512 of the inner lock position ring 316 located between the lock position 328 of the inner lock position ring 316 and the guide ring tooth opening 330 of the inner lock position ring 316. When the locking portion 360 of the napper bar lock pin 308 contacts the first portion 512 of the inner lock position ring 316, the first portion 512 of the inner lock position ring 316 forces and/or holds the napper bar lock pin 308 in a disengaged position.

In the illustrated example of FIG. 5, the central bore 318 of the seat base 106 is located within the circumference of the inner lock position ring 316 and is positioned concentrically relative thereto. The central bore 318 of the seat base 106 defines and/or is aligned with the first axis of rotation 122 of FIG. 1. The central bore 318 of the seat base 106 is shaped and/or configured to receive a mechanical fastener (e.g., a screw, a bolt, a rivet, a pin, etc.) and/or a fastening sleeve through which a mechanical fastener may pass to couple one or more component(s) of the recline assembly 102 (e.g., the seat back connector 120, the napper bar connector 124, etc.) to the seat base 106.

Figure 6B:
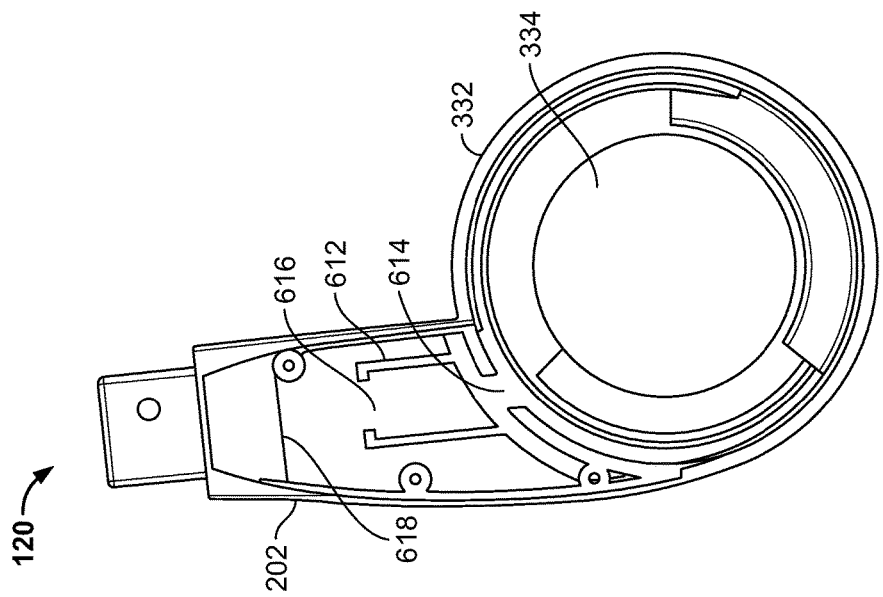
FIG. 6B is an interior side view of the example seat back connector of FIGS. 1-4 and 6A.
Figure 6A:
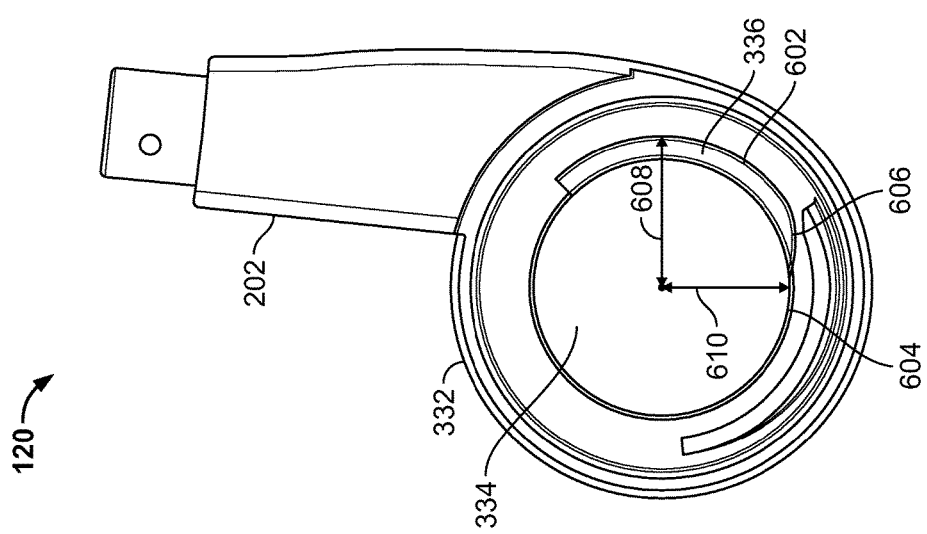
FIG. 6A is an exterior side view of the example seat back connector of FIGS. 1-4.

FIG. 6A is an exterior side view of the example seat back connector 120 of FIGS. 1-4. FIG. 6B is an interior side view of the example seat back connector 120 of FIGS. 1-4 and 6A. The seat back connector 120 of FIGS. 6A and 6B includes the arm portion 202, the round portion 332, the opening 334, the cam surface 336, and the cable opening 338 (not shown in FIGS. 6A and 6B) described above in connection with FIGS. 2-4. The seat back connector 120 of FIGS. 6A and 6B is shaped and/or configured to be rotatably coupled to the seat base 106 of FIGS. 1-5 such that the round portion 332 of the seat back connector 120 covers and/or surrounds the outer lock position ring 314 of the seat base 106 and rotates relative thereto. The opening 334 of the seat back connector 120 of FIGS. 6A and 6B is shaped and/or configured to receive the guide ring 354 of the napper bar connector 124 of FIGS. 3 and 4 as well as a mechanical fastener (e.g., a screw, a bolt, a rivet, a pin, etc.) and/or a fastening sleeve through which a mechanical fastener may pass to couple the seat back connector 120 and one or more other component(s) of the recline assembly 102 (e.g., the napper bar connector 124, etc.) to the seat base 106. The arm portion 202 of the seat back connector 120 of FIGS. 6A and 6B is shaped and/or configured to be rigidly coupled to the seat back 104 of the stroller seat 100 of FIG. 1.

In the illustrated example of FIG. 6A, the cam surface 336 of the seat back connector 120 includes an example outer segment 602, an example inner segment 604, and an example ramped segment 606 located between the outer segment 602 and the inner segment 604. The outer segment 602 of the cam surface 336 is positioned at a first example radial distance 608 from the center of the opening 334 of the seat back connector 120. The inner segment 604 of the cam surface 336 is positioned at a second example radial distance 610 from the center of the opening 334 of the seat back connector 120 that is less than the first radial distance 608.

As further described below in connection with FIGS. 12-25, the ramped segment 606 of the cam surface 336 of the seat back connector 120 is shaped and/or configured to raise and/or lift the cam surface follower 362 of the napper bar lock pin 308 of FIG. 3 to disengage the locking portion 360 of the napper bar lock pin 308 from the lock position 328 of the inner lock position ring 316 of the seat base 106 as the seat back connector 120 rotates toward the front end 128 of the seat base 106 of the stroller seat 100. Once the locking portion 360 of the napper bar lock pin 308 of FIGS. 3 and 4 has been disengaged from the lock position 328 of the inner lock position ring 316 as a result of contact between the cam surface follower 362 of the napper bar locking pin 308 and the ramped segment 606 of the cam surface 336 of the seat back connector 120, the napper bar connector 124 of FIGS. 1-4 is free to rotate relative to the seat base 106 (e.g., toward the front end 128 of the seat base 106). As further described below in connection with FIGS. 12-25, the napper bar lock pin 308 of FIGS. 3 and 4 remains disengaged from the lock position 328 of the inner lock position ring 316 when the cam surface follower 362 of the napper bar lock pin 308 is in contact with the inner segment 604 of the cam surface 336 of the seat back connector 120, and/or when the locking portion 360 of the napper bar lock pin 308 is in contact with the first portion 512 of the inner lock position ring 316 of the seat base 106.

In the illustrated example of FIG. 6A, the cam surface 336 is integrally formed within and/or on the seat back connector 120. In other examples, the cam surface 336 may be formed by one or more component(s) rigidly coupled to the seat back connector 120 via one or more mechanical fastener(s) (e.g., a screw, a bolt, a rivet, a pin, a clip, etc.).

In the illustrated example of FIG. 6B, the seat back connector 120 further includes the example recline lock pin track 612, an example locking tooth notch 614, an example recline lock spring notch 616, and the example interior wall 618. In the illustrated example of FIG. 6B, the recline lock pin track 612 is integrally formed within the arm portion 202 of the seat back connector 120. In other examples, the recline lock pin track 612 may be formed by one or more component(s) rigidly coupled to the seat back connector 120 via one or more mechanical fastener(s) (e.g., a screw, a bolt, a rivet, a pin, a clip, etc.).

In the illustrated example of FIG. 6B, the recline lock pin track 612 defines a path of movement for the recline lock pin 302 of FIGS. 3 and 4. The recline lock pin track 612 is shaped and/or configured to receive and/or guide the recline lock pin 302 such that the recline lock pin 302 is slidable with the recline lock pin track 612. The locking tooth notch 614 of the seat back connector 120 of FIG. 6B is shaped and/or configured to receive a portion of the locking tooth 340 of the recline lock pin 302 as the recline lock pin 302 slides within the recline lock pin track 612. The recline lock spring notch 616 of the seat back connector 120 of FIG. 6B is shaped and/or configured to receive a portion of the recline lock spring 304 of FIG. 3 such that the first end 344 of the recline lock spring 304 is in contact with the recline lock pin 302 and the second end 346 of the recline lock spring 304 is in contact with the interior wall 618 of the seat back connector 120. As further described below in connection with FIGS. 12-25, the recline lock pin 302 is biased by the recline lock spring 304 within the recline lock pin track 612 toward the locking tooth notch 614 and away from the interior wall 618.

FIG. 7A is an exterior side view of the example recline lock pin 302 of FIGS. 3 and 4. FIG. 7B is an interior side view of the example recline lock pin 302 of FIGS. 3, 4 and 7A. The recline lock pin 302 of FIGS. 7A and 7B includes the locking tooth 340, the stem 342, and the cable opening 348 (not shown in FIGS. 7A and 7B) described above in connection with FIGS. 3 and 4. The recline lock pin 302 of FIGS. 7A and 7B is shaped and/or configured to be received in the recline lock pin track 612 of the seat back connector 120 of FIG. 6B. The locking tooth 340 of the recline lock pin 302 of FIGS. 7A and 7B is shaped and/or configured to pass through the locking tooth notch 614 of the seat back connector 120 of FIG. 6B and to selectively engage and/or mate with one of the first, second, third and fourth example lock positions 320, 322, 324, 326 of the outer locking position ring 314 of the seat base 106 to lock the position of the seat back connector 120 relative to the seat base 106. The stem 342 of the recline lock pin 302 of FIGS. 7A and 7B is shaped and/or configured to be received within the first end 344 of the recline lock spring 304 of FIG. 3 to operatively couple the recline lock spring 304 to the recline lock pin 302.

In the illustrated example of FIGS. 7A and 7B, the recline lock pin 302 further includes an example cable retainer 702. The cable retainer 702 retains the first end 350 of the recline cable 306 of FIG. 3 within the recline lock pin 302 such that the first end 350 of the recline cable 306 is operatively coupled to the recline lock pin 302.

Figure 8:
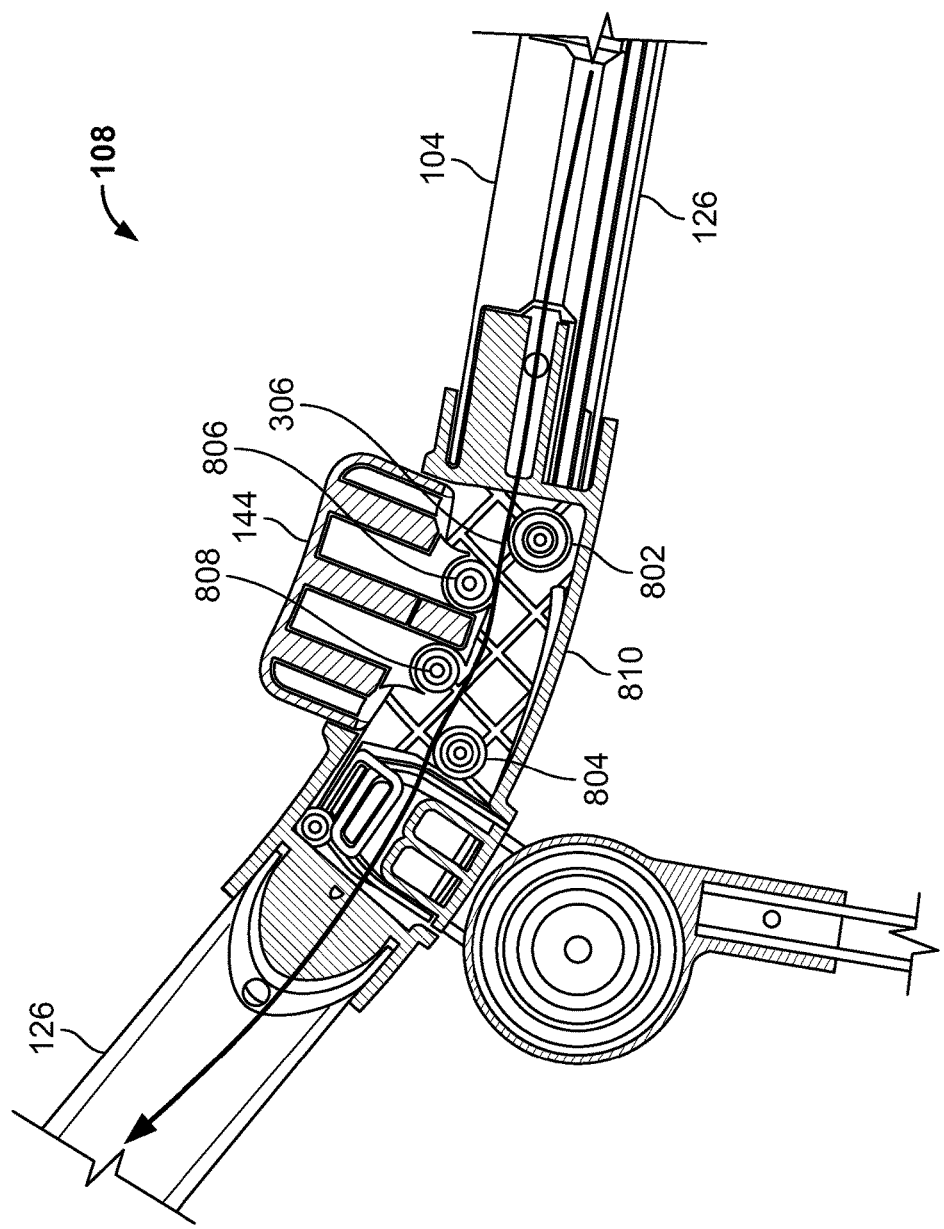
FIG. 8 is a cross-sectional view of the example actuation assembly of FIGS. 1 and 2 in a first example position.
Figure 9:
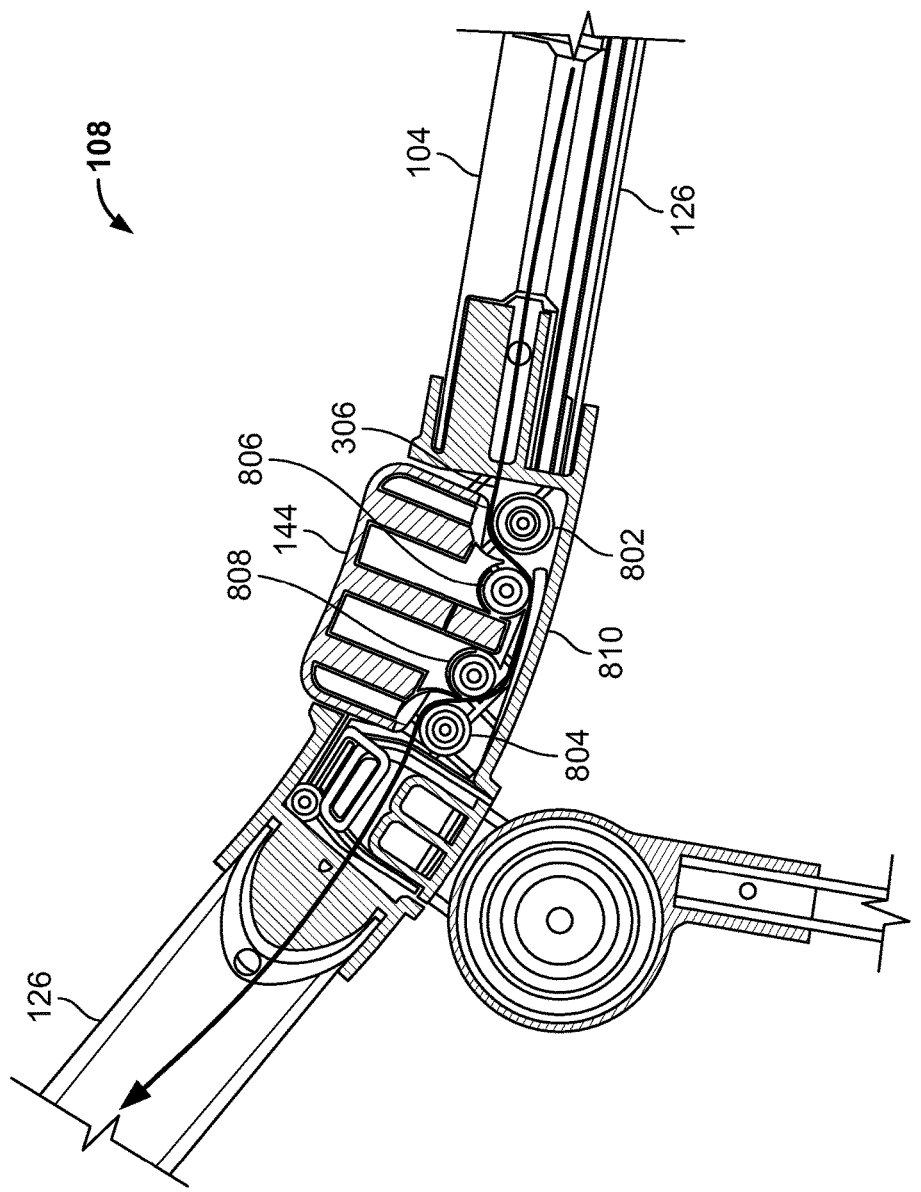
FIG. 9 is a cross-sectional view of the example actuation assembly of FIGS. 1, 2 and 8 in a second example position.

FIG. 8 is a cross-sectional view of the example actuation assembly 108 of FIGS. 1 and 2 in a first example position. The first example position of the actuation assembly 108 of FIG. 8 corresponds to the recline lock pin 302 of FIGS. 3, 4, 7A and 7B being in an engaged position relative to one of the first, second, third and fourth lock positions 320, 322, 324, 326 of the outer lock position ring 314 of the seat base 106 of FIGS. 1-5. FIG. 9 is a cross-sectional view of the example actuation assembly 108 of FIGS. 1, 2 and 8 in a second example position. The second example position of the actuation assembly 108 of FIG. 9 corresponds to the recline lock pin 302 of FIGS. 3, 4, 7A and 7B being in a disengaged position relative to one of the first, second, third and fourth lock positions 320, 322, 324, 326 of the outer lock position ring 314 of the seat base 106 of FIGS. 1-5.

The actuation assembly 108 of FIGS. 8 and 9 is rigidly coupled (e.g., via one or more mechanical fastener(s) such as a screw, a bolt, a rivet, a pin, a clip, etc.) to one or more of the seat back frame members 126 of the seat back 104, and operatively coupled to the recline cable 306 of the recline assembly 102. In the illustrated example of FIGS. 8 and 9, the actuation assembly 108 includes the lever 144 described above in connection with FIG. 1, and further includes a first example pulley 802, a second example pulley 804, a third example pulley 806, and a fourth example pulley 808. The first and second pulleys 802, 804 are coupled to an example housing 810 of the actuation assembly 108. The third and fourth pulleys 806, 808 are located between the first and second pulleys 802, 804. The third and fourth pulleys 806, 808 are coupled to the lever 144 such that movement (e.g., translational movement) of the lever 144 produces a corresponding movement (e.g., translational movement) of the third and fourth pulleys 806, 808 relative to the first and second pulleys 802, 804. In some examples, the actuation assembly 108 may include fewer or additional pulleys relative to the number of pulleys illustrated in FIGS. 8 and 9.

In the illustrated example of FIGS. 8 and 9, each of the first, second, third and fourth pulleys 802, 804, 806, 808 is shaped and/or configured to engage and/or mate with the recline cable 306. Engagement of the recline cable 306 with one or more of the first, second, third and/or fourth pulleys 802, 804, 806, 808 results in the recline cable 306 being tensioned. In the illustrated example of FIG. 8, the lever 144 is biased in a first direction (e.g., away from the seat back frame member(s) 126 of the seat back 104 and/or away from the housing 810 of the actuation assembly 108) by tension applied to the recline cable 306. In the illustrated example of FIG. 9, the lever 144 has been actuated and/or moved (e.g., manually pushed) in a second direction opposite the first direction (e.g., toward the seat back frame member(s) 126 of the seat back 104 and/or toward the housing 810 of the actuation assembly 108).

Actuation and/or movement of the lever 144 in the second direction (e.g., as shown in FIG. 9) increases the tension applied to the recline cable 306. Increasing the tension in the recline cable 306 in response to actuation of the lever 144 of the actuation assembly 108 causes the recline lock pin 302 to be moved from an engaged position to a disengaged position that enables the seat back connector 120 to rotate relative to the seat base 106.

Figure 10B:
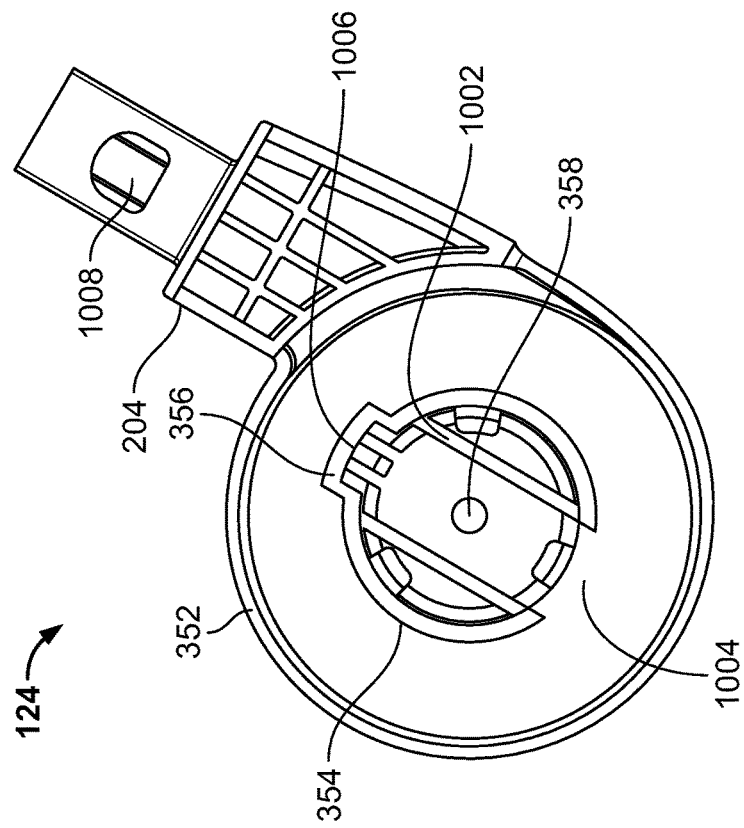
FIG. 10B is an interior side view of the example napper bar connector of FIGS. 1-4 and 10A.
Figure 10A:
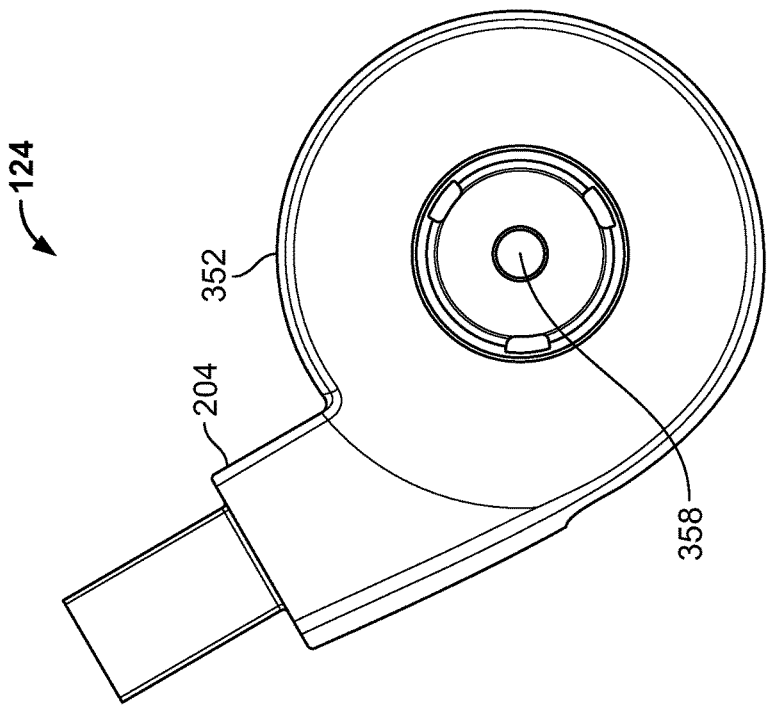
FIG. 10A is an exterior side view of the example napper bar connector of FIGS. 1-4.

FIG. 10A is an exterior side view of the example napper bar connector 124 of FIGS. 1-4. FIG. 10B is an interior side view of the example napper bar connector 124 of FIGS. 1-4 and 10A. The napper bar connector 124 of FIGS. 10A and 10B includes the arm portion 204, the round portion 352, the guide ring 354, the guide ring tooth 356, and the central bore 358 described above in connection with FIGS. 2-4. The napper bar connector 124 of FIGS. 10A and 10B is shaped and/or configured to be rotatably coupled to the seat base 106 of FIG. 1-5. More specifically, the guide ring 354 of the napper bar connector 124 of FIG. 10B is shaped and/or configured to be received within the circumference of the inner lock position ring 316 of the seat base 106 and to rotate relative thereto. When the napper bar connector 124 is coupled to the seat base 106, the guide ring tooth 356 of the guide ring 354 extends into and/or through the guide ring tooth opening 330 of the inner lock position ring 316 of the seat base 106. In some examples, the round portion 352 of the napper bar connector 124 is shaped and/or configured to cover a portion of the seat back connector 120 of the recline assembly 102 and/or a portion of the inner lock position ring 316 of the seat base 106, and to rotate relative thereto.

In the illustrated example of FIGS. 10A and 10B, the central bore 358 of the napper bar connector 124 defines and/or is aligned with the first axis of rotation 122 of FIG. 1. The central bore 358 of the napper bar connector 124 of FIGS. 10A and 10B is shaped and/or configured to receive a mechanical fastener (e.g., a screw, a bolt, a rivet, a pin, etc.) and/or a fastening sleeve through which a mechanical fastener may pass to couple the napper bar connector 124 and one or more other component(s) of the recline assembly 102 (e.g., the seat back connector 120, etc.) to the seat base 106. The arm portion 204 of the napper bar connector 124 of FIGS. 10A and 10B is shaped and/or configured to be detachably coupled in a rigid manner to the napper bar 110 of the stroller seat 100 of FIG. 1.

In the illustrated example of FIG. 10B, the guide ring 354 and/or, more generally, the napper bar connector 124 further includes the example napper bar lock pin track 1002, an example guide ring notch 1004 and the example interior wall 1006. In the illustrated example of FIG. 10B, the napper bar lock pin track 1002 and the guide ring 354 are integrally formed within the round portion 352 of the napper bar connector 124. In other examples, the napper bar lock pin track 1002 and/or the guide ring 354 may be formed by one or more component(s) rigidly coupled to the napper bar connector 124 via one or more mechanical fastener(s) (e.g., a screw, a bolt, a rivet, a pin, a clip, etc.).

In the illustrated example of FIG. 10B, the napper bar lock pin track 1002 defines a path of movement for the napper bar lock pin 308 of FIGS. 3 and 4. The napper bar lock pin track 1002 is shaped and/or configured to receive the napper bar lock pin 308 of FIGS. 3 and 4 such that the napper bar lock pin 308 is slidable within the napper bar lock pin track 1002. The guide ring notch 1004 of the guide ring 354 of FIG. 10B is shaped and/or configured to receive the locking portion 360 of the napper bar lock pin 308 as the napper bar lock pin 308 slides within the napper bar lock pin track 1002. The interior of the guide ring tooth 356 of the guide ring 354 of FIG. 10B is shaped and/or configured to receive a portion of the napper bar lock spring 310 of FIG. 3 such that the first end 368 of the napper bar lock spring 310 is in contact with the napper bar lock pin 308 and the second end 370 of the napper bar lock spring 310 is in contact with the interior wall 1006 of the guide ring 354 of FIG. 10B. As further described below in connection with FIGS. 12-25, the napper bar lock pin 308 is biased by the napper bar lock spring 310 within the napper bar lock pin track 1002 toward the guide ring notch 1004 and away from the interior wall 1006.

In the illustrated example of FIG. 10B, the napper bar connector 124 further includes an example opening 1008 formed in the arm portion 204 of the napper bar connector 124. The opening 1008 is shaped and/or configured to receive a spring-loaded button to detachably couple the napper bar 110 to the napper bar connector 124 in a rigid manner.

Figure 11B:
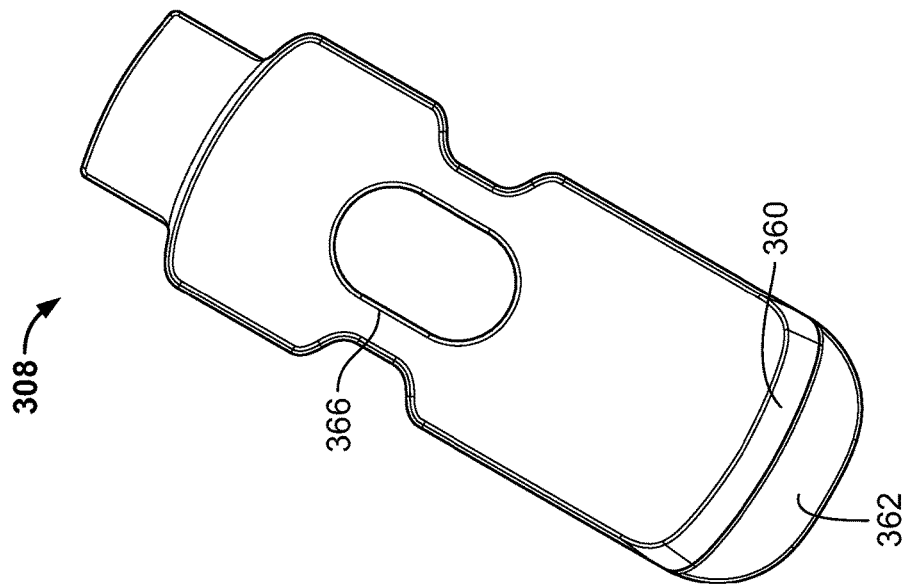
FIG. 11B is an interior side view of the example napper bar lock pin of FIGS. 3, 4 and 11A.
Figure 11A:
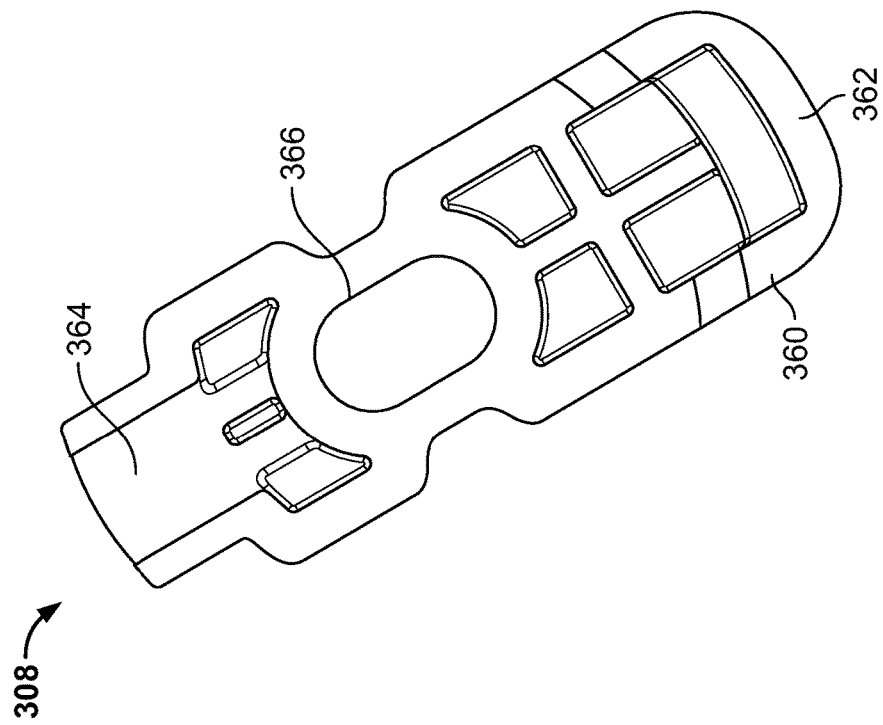
FIG. 11A is an exterior side view of the example napper bar lock pin of FIGS. 3 and 4.

FIG. 11A is an exterior side view of the example napper bar lock pin 308 of FIGS. 3 and 4. FIG. 11B is an interior side view of the example napper bar lock pin 308 of FIGS. 3, 4 and 11A. The napper bar lock pin 308 of FIGS. 11A and 11B includes the locking portion 360, the cam surface follower 362, the spring area 364, and the travel slot 366 described above in connection with FIGS. 3 and 4. The napper bar lock pin 308 of FIGS. 11A and 11B is shaped and/or configured to be received in the napper bar lock pin track 1002 of the napper bar connector 124 of FIG. 10B. The locking portion 360 of the napper bar lock pin 308 of FIGS. 11A and 11B is shaped and/or configured to pass through the guide ring notch 1004 of the guide ring 354 of the napper bar connector 124, and to selectively pass through the lock position 328 of the inner lock position ring 316 of the seat base 106 to lock the position of the napper bar connector 124 relative to the seat base 106. The cam surface follower 362 of the napper bar lock pin 308 of FIGS. 11A and 11B extends from the locking portion 360 of the napper bar lock pin 308 and is shaped and/or configured to contact and/or to be guided by the cam surface 336 of the round portion 332 of the seat back connector 120 to control the position of the napper bar lock pin 308 within the napper bar lock pin track 1002 of the napper bar connector 124. The spring area 364 of the napper bar lock pin 308 of FIGS. 11A and 11B is shaped and/or configured to receive the napper bar lock spring 310 of FIG. 3 to operatively couple the napper bar lock spring 310 to the napper bar lock pin 308. The travel slot 366 of the napper bar lock pin 308 of FIGS. 11A and 11B defines a range of motion of the napper bar lock pin 308 along the napper bar lock pin track 1002 of the napper bar connector 124. The travel slot 366 is shaped and/or configured to receive a mechanical fastener (e.g., a screw, a bolt, a rivet, a pin, etc.) and/or a fastening sleeve through which a mechanical fastener may pass to couple the napper bar lock pin 308 and one or more other component(s) of the recline assembly 102 (e.g., the seat back connector 120, the napper bar connector 124, etc.) to the seat base 106.

Figure 12:
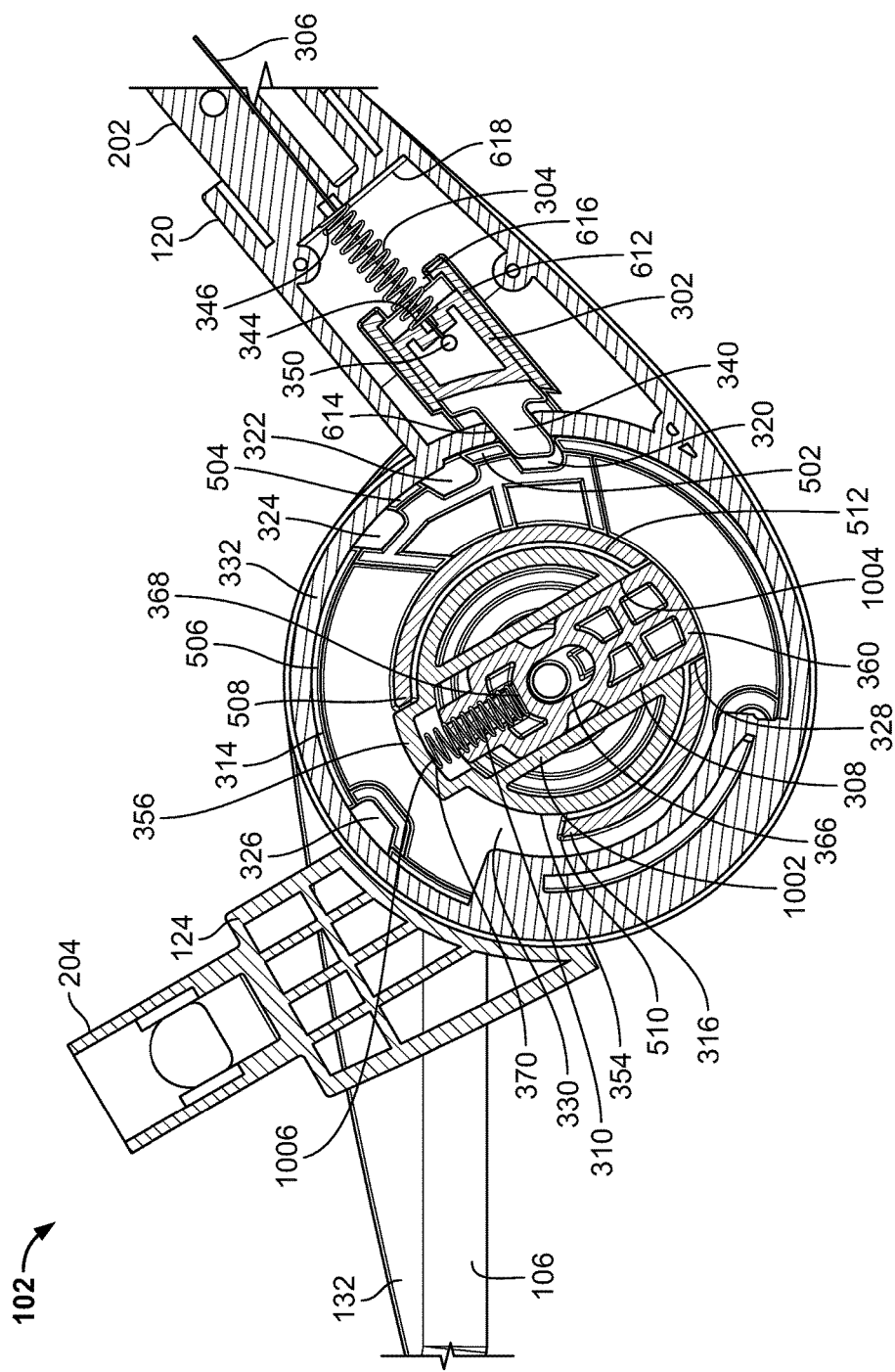
FIG. 12 is a partial cutaway view of the example recline assembly of FIGS. 1-4 in a first example position.

FIG. 12 is a partial cutaway view of the example recline assembly 102 of FIGS. 1-4 in a first example position. In the illustrated example of FIG. 12, the recline lock pin 302 is biased within the recline lock pin track 612 of the seat back connector 120 by the recline lock spring 304 toward the locking tooth notch 614 of the seat back connector 120 and/or away from the interior wall 618 of the seat back connector 120. The locking tooth 340 of the recline lock pin 302 extends through the locking tooth notch 614 of the seat back connector 120 and is engaged with the first lock position 320 of the outer lock position ring 314 of the seat base 106. The engagement of the locking tooth 340 of the recline lock pin 302 with the first lock position 320 of the outer lock position ring 314 of the seat base 106 locks the seat back connector 120 such that the seat back connector 120 is unable to rotate relative to the seat base 106. In the illustrated example of FIG. 12, the arm portion 202 of the seat back connector 120 is reclined and/or positioned at an angle of approximately one hundred forty-five degrees (145°) relative to the seat base 106.

In the illustrated example of FIG. 12, the napper bar lock pin 308 is biased within the napper bar lock pin track 1002 of the napper bar connector 124 by the napper bar lock spring 310 toward the guide ring notch 1004 of the guide ring 354 of the napper bar connector 124 and/or away from the interior wall 1006 of the guide ring 354 of the napper bar connector 124. The guide ring tooth 356 of the guide ring 354 of the napper bar connector 124 extends into the guide ring tooth opening 330 of the inner lock position ring 316 of the seat base 106. When the locking portion 360 of the napper bar lock pin 308 is disengaged from the lock position 328 of the inner lock position ring 316, the guide ring tooth 356 is free to rotate within the guide ring tooth opening 330 between the first end 508 and the second end 510 of the of the guide ring tooth opening 330. In the illustrated example of FIG. 12, the guide ring tooth 356 is positioned adjacent the first end 508 of the guide ring tooth opening 330.

In the illustrated example of FIG. 12, the locking portion 360 of the napper bar lock pin 308 extends through the guide ring notch 1004 of the guide ring 354 of the napper bar connector 124 and into the lock position 328 of the inner lock position ring 316 of the seat base 106 such that the locking portion 360 of the napper bar lock pin 308 is engaged with the lock position 328 of the inner lock position ring 316 of the seat base 106. The engagement of the locking portion 360 of the napper bar lock pin 308 with the lock position 328 of the inner lock position ring 316 of the seat base 106 locks the napper bar connector 124 such that the napper bar connector 124 is unable to rotate relative to the seat base 106. When the seat back connector 120 and the napper bar connector 124 are positioned as shown in FIG. 12, the cam surface follower 362 of the napper bar lock pin 308 contacts and/or is adjacent to the outer segment 602 of the cam surface 336 (not shown in FIG. 12) of the seat back connector 120.

Figure 13:
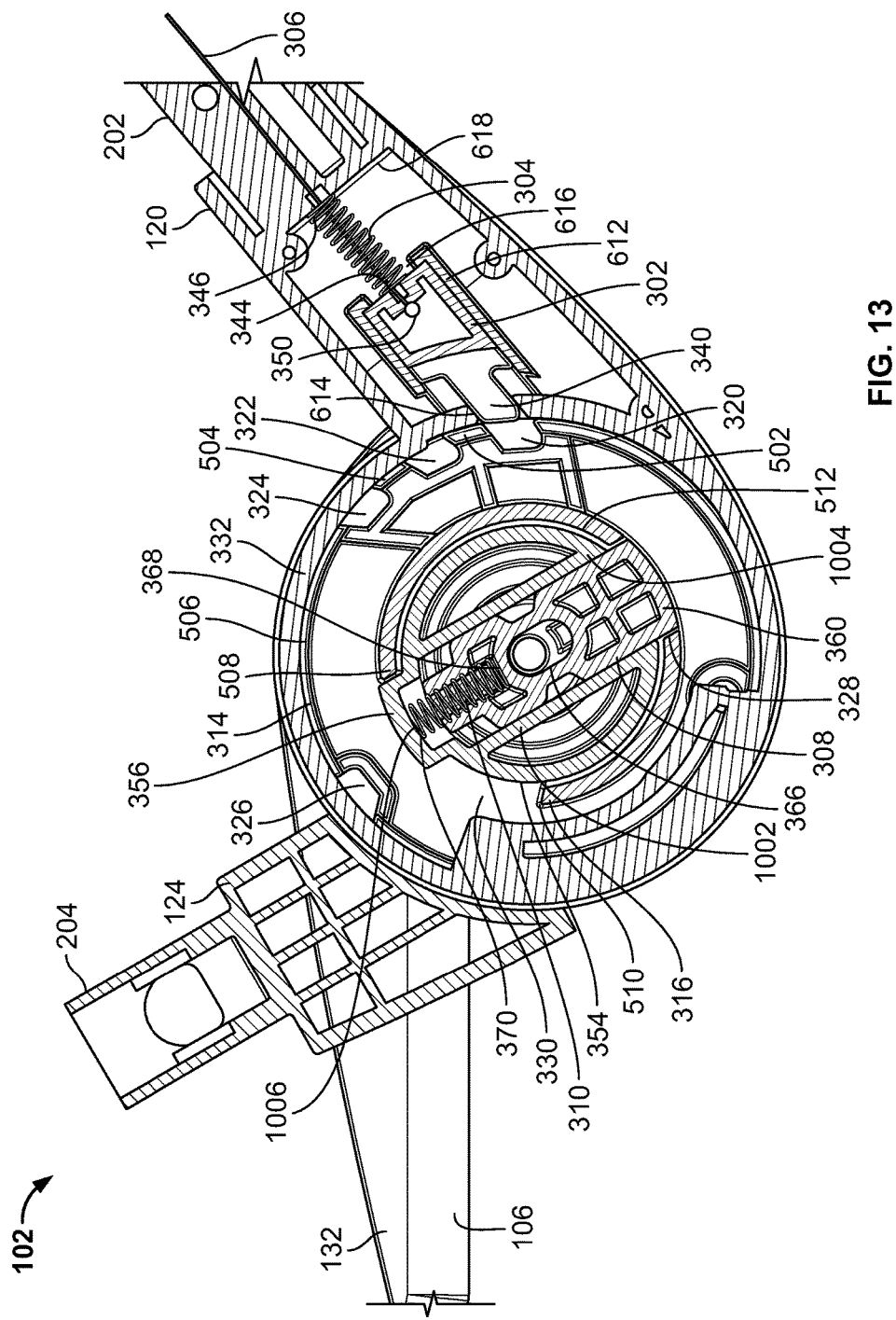
FIG. 13 is a partial cutaway view of the example recline assembly of FIGS. 1-4 and 12 in a second example position.

FIG. 13 is a partial cutaway view of the example recline assembly 102 of FIGS. 1-4 and 12 in a second example position. In the illustrated example of FIG. 13, the position of the seat back connector 120 remains unchanged relative to the example position of the seat back connector 120 described above in connection with FIG. 12. The position of the locking tooth 340 of the recline lock pin 302 within the recline lock pin track 612 of the seat back connector 120 has changed, however, relative to the example position of the locking tooth 340 of the recline lock pin 302 described above in connection with FIG. 12. In the illustrated example of FIG. 13, the locking tooth 340 of the recline lock pin 302 is disengaged from the first lock position 320 of the outer lock position ring 314 of the seat base 106. The locking tooth 340 of the recline lock pin 302 may be disengaged from the first lock position 320 in response to an increase in the tension applied to the recline cable 306 coupled to the recline lock pin 302. The increase in tension may occur, for example, in response to actuation of the lever 144 of the actuation assembly 108 of FIGS. 1, 2, 8 and 9. In the illustrated example of FIG. 13, the disengagement of the locking tooth 340 of the recline lock pin 302 from the first lock position 320 of the outer lock position ring 314 of the seat base 106 unlocks the seat back connector 120 such that the seat back connector 120 is free to rotate relative to the seat base 106.

In the illustrated example of FIG. 13, the position of the napper bar lock pin 308 remains unchanged relative to the example position of the napper bar lock pin 308 described above in connection with FIG. 12. Thus, the cam surface follower 362 of the napper bar lock pin 308 remains in contact with and/or adjacent to the outer segment 602 of the cam surface 336 of the seat back connector 120, the locking portion 360 of the napper bar lock pin 308 remains engaged with the lock position 328 of the inner lock position ring 316 of the seat base 106, and the napper bar connector 124 remains locked and/or unable to rotate relative to the seat base 106.

Figure 14:
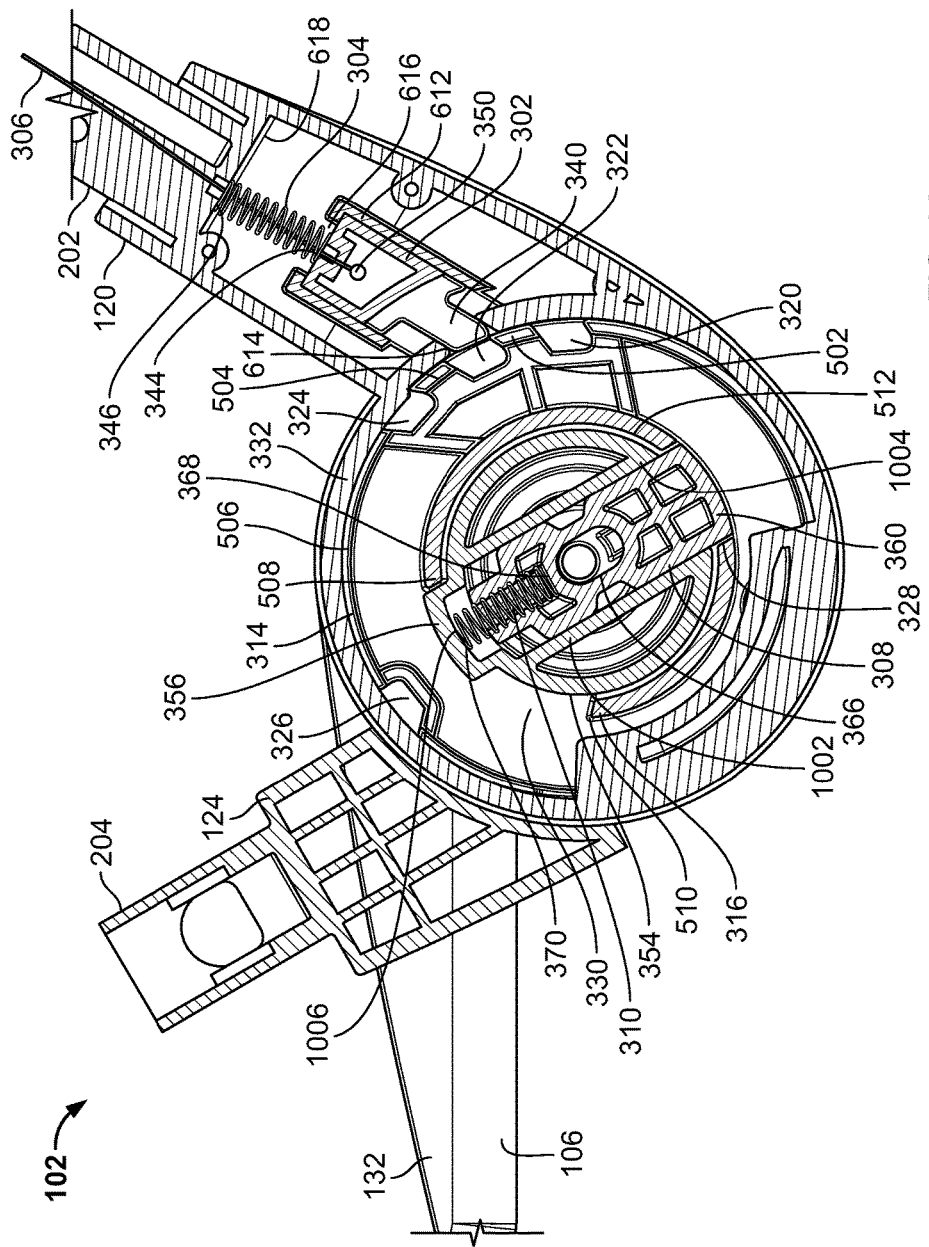
FIG. 14 is a partial cutaway view of the example recline assembly of FIGS. 1-4, 12 and 13 in a third example position.

FIG. 14 is a partial cutaway view of the example recline assembly 102 of FIGS. 1-4, 12 and 13 in a third example position. In the illustrated example of FIG. 14, the locking tooth 340 of the recline lock pin 302 remains disengaged from the first lock position 320 of the outer lock position ring 314 of the seat base 106, as described above in connection with FIG. 13. The position of the seat back connector 120 has changed, however, relative to the example position of the seat back connector 120 described above in connection with FIG. 13. In the illustrated example of FIG. 14, the arm portion 202 of the seat back connector 120 is rotated forward (e.g., toward the front end 128 of the seat base 106) relative to the example position of the arm portion 202 of the seat back connector 120 shown in FIG. 13. The locking tooth 340 of the recline lock pin 302 contacts the first portion 502 of the outer lock position ring 314 of the seat base 106 located between the first lock position 320 of the outer lock position ring 314 and the second lock position 322 of the outer lock position ring 314. When the locking tooth 340 of the recline lock pin 302 contacts the first portion 502 of the outer lock position ring 314 (as shown in FIG. 14), the first portion 502 of the outer lock position ring 314 forces and/or holds the recline lock pin 302 in a disengaged position without requiring the tension in the recline cable 306 to be increased via actuation of the lever 144 of the actuation assembly 108. Accordingly, when the locking tooth 340 of the recline lock pin 302 contacts the first portion 502 of the outer lock position ring 314 (as shown in FIG. 14), the seat back connector 120 is free to rotate between a first recline position corresponding to the first lock position 320 of the outer lock position ring 314 of the seat base 106 and a second recline position corresponding to the second lock position 322 of the outer lock position ring 314 of the seat base 106.

In the illustrated example of FIG. 14, the position of the napper bar lock pin 308 remains unchanged relative to the example position of the napper bar lock pin 308 described above in connection with FIGS. 12 and 13. Thus, the cam surface follower 362 of the napper bar lock pin 308 remains in contact with and/or adjacent to the outer segment 602 of the cam surface 336 of the seat back connector 120, the locking portion 360 of the napper bar lock pin 308 remains engaged with the lock position 328 of the inner lock position ring 316 of the seat base 106, and the napper bar connector 124 remains locked and/or unable to rotate relative to the seat base 106.

Figure 15:
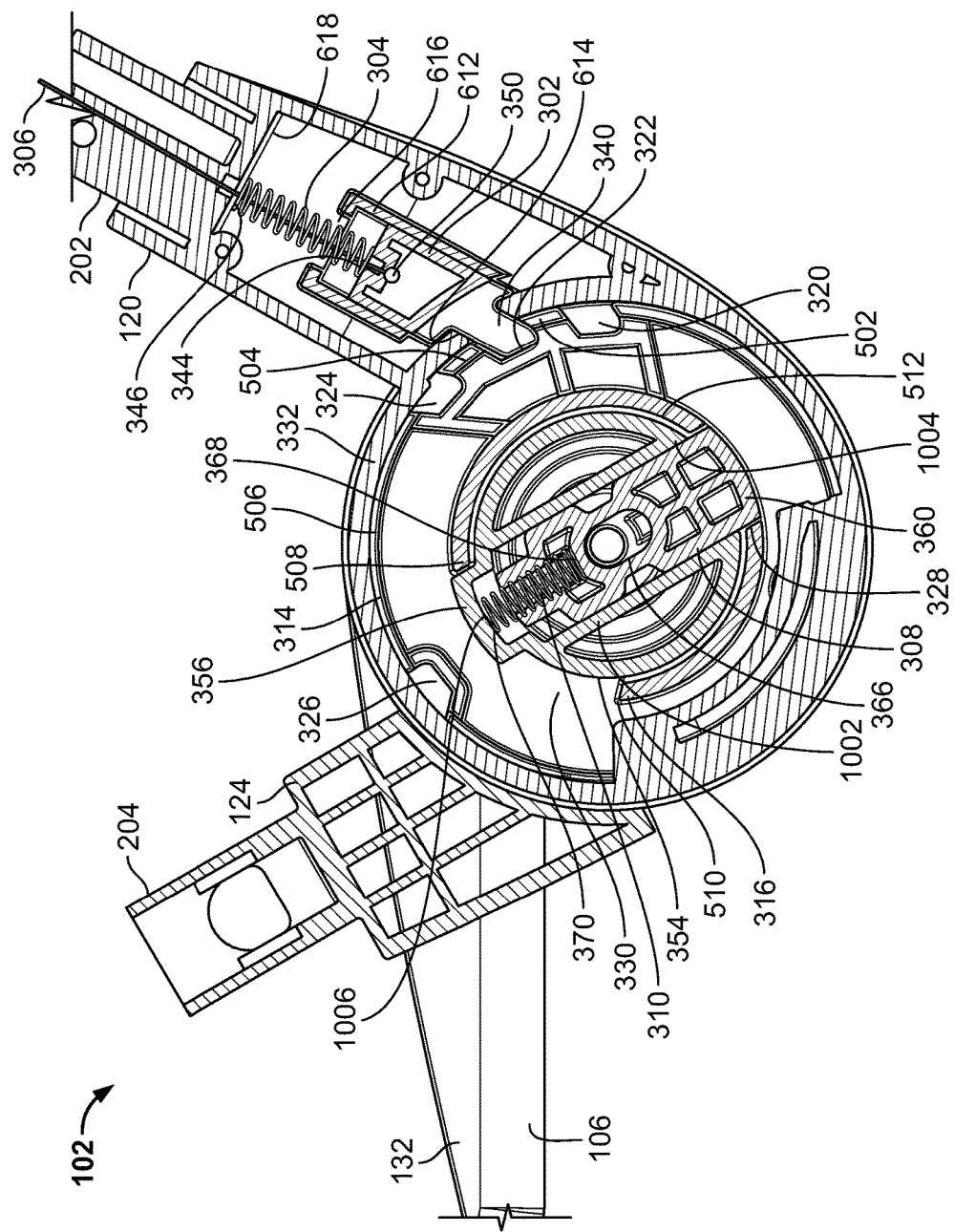
FIG. 15 is a partial cutaway view of the example recline assembly of FIGS. 1-4 and 12-14 in a fourth example position.

FIG. 15 is a partial cutaway view of the example recline assembly 102 of FIGS. 1-4 and 12-14 in a fourth example position. The position of the seat back connector 120 has changed relative to the example position of the seat back connector 120 described above in connection with FIG. 14. In the illustrated example of FIG. 15, the arm portion 202 of the seat back connector 120 is rotated forward (e.g., toward the front end 128 of the seat base 106) relative to the example position of the arm portion 202 of the seat back connector 120 shown in FIG. 14. The locking tooth 340 of the recline lock pin 302 extends through the locking tooth notch 614 of the seat back connector 120 and is engaged with the second lock position 322 of the outer lock position ring 314 of the seat base 106. The engagement of the locking tooth 340 of the recline lock pin 302 with the second lock position 322 of the outer lock position ring 314 of the seat base 106 locks the seat back connector 120 such that the seat back connector 120 is unable to rotate relative to the seat base 106. In the illustrated example of FIG. 15, the arm portion 202 of the seat back connector 120 is reclined and/or positioned at an angle of approximately one hundred twenty-two and a half degrees (122.5°) relative to the seat base 106.

In the illustrated example of FIG. 15, the position of the napper bar lock pin 308 remains unchanged relative to the example position of the napper bar lock pin 308 described above in connection with FIGS. 12-14. Thus, the cam surface follower 362 of the napper bar lock pin 308 remains in contact with and/or adjacent to the outer segment 602 of the cam surface 336 of the seat back connector 120, the locking portion 360 of the napper bar lock pin 308 remains engaged with the lock position 328 of the inner lock position ring 316 of the seat base 106, and the napper bar connector 124 remains locked and/or unable to rotate relative to the seat base 106.

Figure 16:
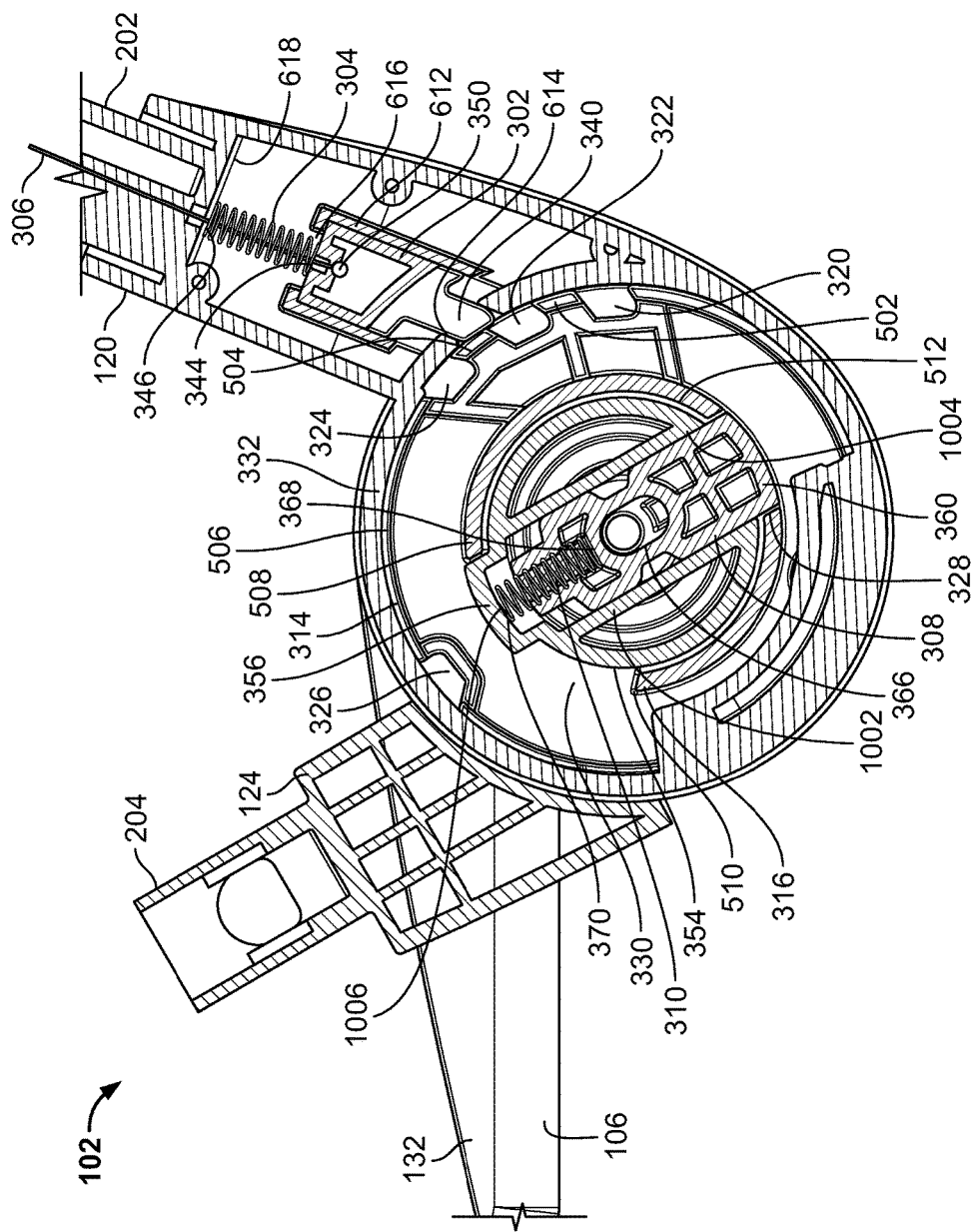
FIG. 16 is a partial cutaway view of the example recline assembly of FIGS. 1-4 and 12-15 in a fifth example position.

FIG. 16 is a partial cutaway view of the example recline assembly 102 of FIGS. 1-4 and 12-15 in a fifth example position. In the illustrated example of FIG. 16, the position of the locking tooth 340 of the recline lock pin 302 within the recline lock pin track 612 of the seat back connector 120 has changed relative to the example position of the locking tooth 340 of the recline lock pin 302 described above in connection with FIG. 15. The locking tooth 340 of the recline lock pin 302 is disengaged from the second lock position 322 of the outer lock position ring 314 of the seat base 106. The locking tooth 340 of the recline lock pin 302 may have been disengaged from the second lock position 322 in response to an increase in the tension applied to the recline cable 306 coupled to the recline lock pin 302. The increase in tension may have occurred, for example, in response to actuation of the lever 144 of the actuation assembly 108 of FIGS. 1, 2, 8 and 9.

In the illustrated example of FIG. 16, the position of the seat back connector 120 has also changed relative to the example position of the seat back connector 120 described above in connection with FIG. 15. In the illustrated example of FIG. 16, the arm portion 202 of the seat back connector 120 is rotated forward (e.g., toward the front end 128 of the seat base 106) relative to the example position of the arm portion 202 of the seat back connector 120 shown in FIG. 15. The locking tooth 340 of the recline lock pin 302 contacts the second 504 of the outer lock position ring 314 of the seat base 106 located between the second lock position 322 of the outer lock position ring 314 and the third lock position 324 of the outer lock position ring 314. When the locking tooth 340 of the recline lock pin 302 contacts the second portion 504 of the outer lock position ring 314 (as shown in FIG. 16), the second portion 504 of the outer lock position ring 314 forces and/or holds the recline lock pin 302 in a disengaged position without requiring the tension in the recline cable 306 to be increased via actuation of the lever 144 of the actuation assembly 108. Accordingly, when the locking tooth 340 of the recline lock pin 302 contacts the second portion 504 of the outer lock position ring 314 (as shown in FIG. 16), the seat back connector 120 is free to rotate between a second recline position corresponding to the second lock position 322 of the outer lock position ring 314 of the seat base 106 and a third recline position corresponding to the third lock position 324 of the outer lock position ring 314 of the seat base 106.

In the illustrated example of FIG. 16, the position of the napper bar lock pin 308 remains unchanged relative to the example position of the napper bar lock pin 308 described above in connection with FIGS. 12-15. Thus, the cam surface follower 362 of the napper bar lock pin 308 remains in contact with and/or adjacent to the outer segment 602 of the cam surface 336 of the seat back connector 120, the locking portion 360 of the napper bar lock pin 308 remains engaged with the lock position 328 of the inner lock position ring 316 of the seat base 106, and the napper bar connector 124 remains locked and/or unable to rotate relative to the seat base 106.

Figure 17:
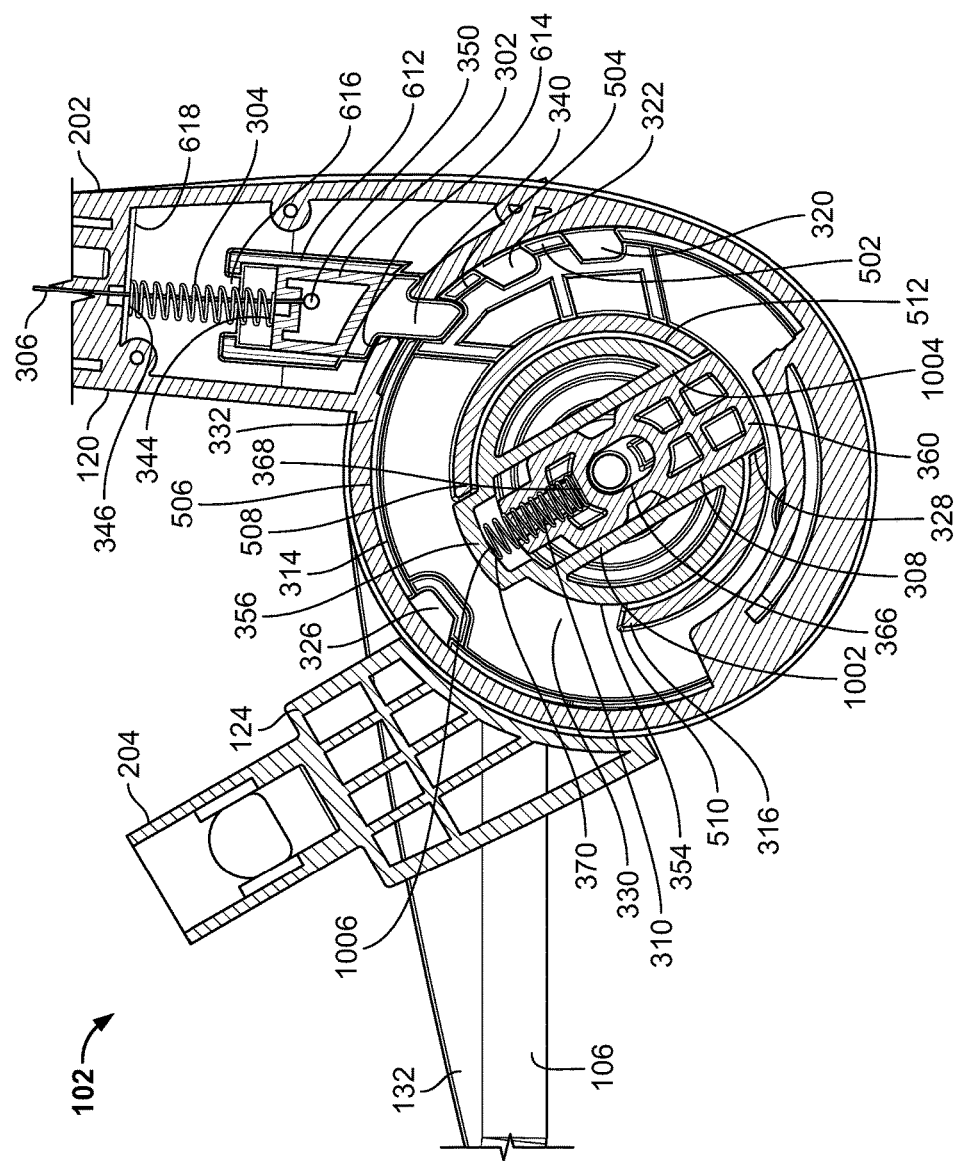
FIG. 17 is a partial cutaway view of the example recline assembly of FIGS. 1-4 and 12-16 in a sixth example position.

FIG. 17 is a partial cutaway view of the example recline assembly 102 of FIGS. 1-4 and 12-16 in a sixth example position. The position of the seat back connector 120 has changed relative to the example position of the seat back connector 120 described above in connection with FIG. 16. In the illustrated example of FIG. 17, the arm portion 202 of the seat back connector 120 is rotated forward (e.g., toward the front end 128 of the seat base 106) relative to the example position of the arm portion 202 of the seat back connector 120 shown in FIG. 16. The locking tooth 340 of the recline lock pin 302 extends through the locking tooth notch 614 of the seat back connector 120 and is engaged with the third lock position 324 of the outer lock position ring 314 of the seat base 106. The engagement of the locking tooth 340 of the recline lock pin 302 with the third lock position 324 of the outer lock position ring 314 of the seat base 106 locks the seat back connector 120 such that the seat back connector 120 is unable to rotate relative to the seat base 106. In the illustrated example of FIG. 17, the arm portion 202 of the seat back connector 120 is reclined and/or positioned at an angle of approximately one hundred degrees (100°) relative to the seat base 106.

In the illustrated example of FIG. 17, the position of the napper bar lock pin 308 remains unchanged relative to the example position of the napper bar lock pin 308 described above in connection with FIGS. 12-16. Thus, the cam surface follower 362 of the napper bar lock pin 308 remains in contact with and/or adjacent to the outer segment 602 of the cam surface 336 of the seat back connector 120, the locking portion 360 of the napper bar lock pin 308 remains engaged with the lock position 328 of the inner lock position ring 316 of the seat base 106, and the napper bar connector 124 remains locked and/or unable to rotate relative to the seat base 106.

Figure 18:
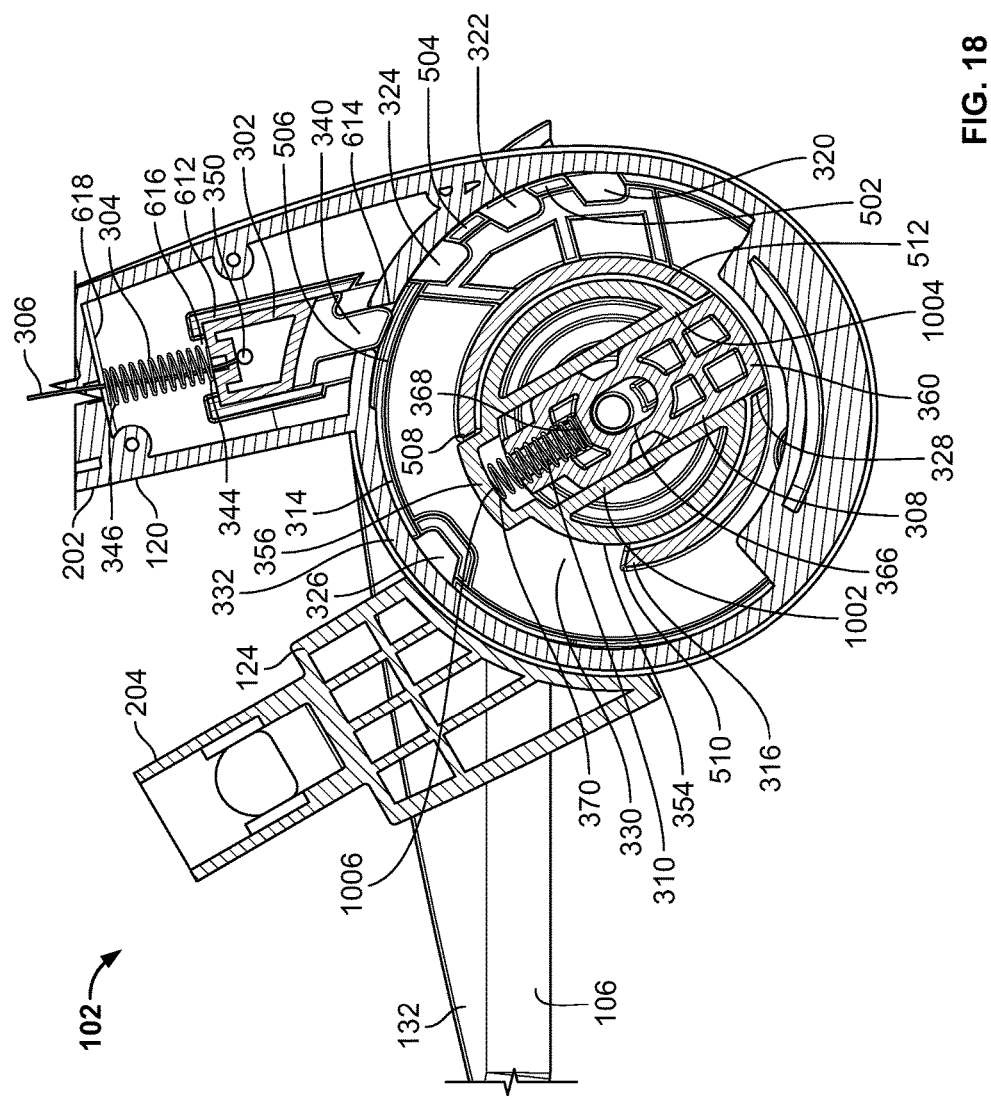
FIG. 18 is a partial cutaway view of the example recline assembly of FIGS. 1-4 and 12-17 in a seventh example position.

FIG. 18 is a partial cutaway view of the example recline assembly 102 of FIGS. 1-4 and 12-17 in a seventh example position. In the illustrated example of FIG. 18, the position of the locking tooth 340 of the recline lock pin 302 within the recline lock pin track 612 of the seat back connector 120 has changed relative to the example position of the locking tooth 340 of the recline lock pin 302 described above in connection with FIG. 17. The locking tooth 340 of the recline lock pin 302 is disengaged from the third lock position 324 of the outer lock position ring 314 of the seat base 106. The locking tooth 340 of the recline lock pin 302 may have been disengaged from the third lock position 322 in response to an increase in the tension applied to the recline cable 306 coupled to the recline lock pin 302. The increase in tension may have occurred, for example, in response to actuation of the lever 144 of the actuation assembly 108 of FIGS. 1, 2, 8 and 9.

In the illustrated example of FIG. 18, the position of the seat back connector 120 has also changed relative to the example position of the seat back connector 120 described above in connection with FIG. 17. In the illustrated example of FIG. 18, the arm portion 202 of the seat back connector 120 is rotated forward (e.g., toward the front end 128 of the seat base 106) relative to the example position of the arm portion 202 of the seat back connector 120 shown in FIG. 17. The locking tooth 340 of the recline lock pin 302 contacts the third portion 506 of the outer lock position ring 314 of the seat base 106 located between the third lock position 324 of the outer lock position ring 314 and the fourth lock position 326 of the outer lock position ring 314. When the locking tooth 340 of the recline lock pin 302 contacts the third portion 506 of the outer lock position ring 314 (as shown in FIG. 18), the third portion 506 of the outer lock position ring 314 forces and/or holds the recline lock pin 302 in a disengaged position without requiring the tension in the recline cable 306 to be increased via actuation of the lever 144 of the actuation assembly 108. Accordingly, when the locking tooth 340 of the recline lock pin 302 contacts the third portion 506 of the outer lock position ring 314 (as shown in FIG. 18), the seat back connector 120 is free to rotate between a third recline position corresponding to the third lock position 322 of the outer lock position ring 314 of the seat base 106 and a folded position corresponding to the fourth lock position 326 of the outer lock position ring 314 of the seat base 106.

In the illustrated example of FIG. 18, the position of the napper bar lock pin 308 remains unchanged relative to the example position of the napper bar lock pin 308 described above in connection with FIGS. 12-17. Thus, the cam surface follower 362 of the napper bar lock pin 308 remains in contact with and/or adjacent to the outer segment 602 of the cam surface 336 of the seat back connector 120, the locking portion 360 of the napper bar lock pin 308 remains engaged with the lock position 328 of the inner lock position ring 316 of the seat base 106, and the napper bar connector 124 remains locked and/or unable to rotate relative to the seat base 106.

Figure 19:
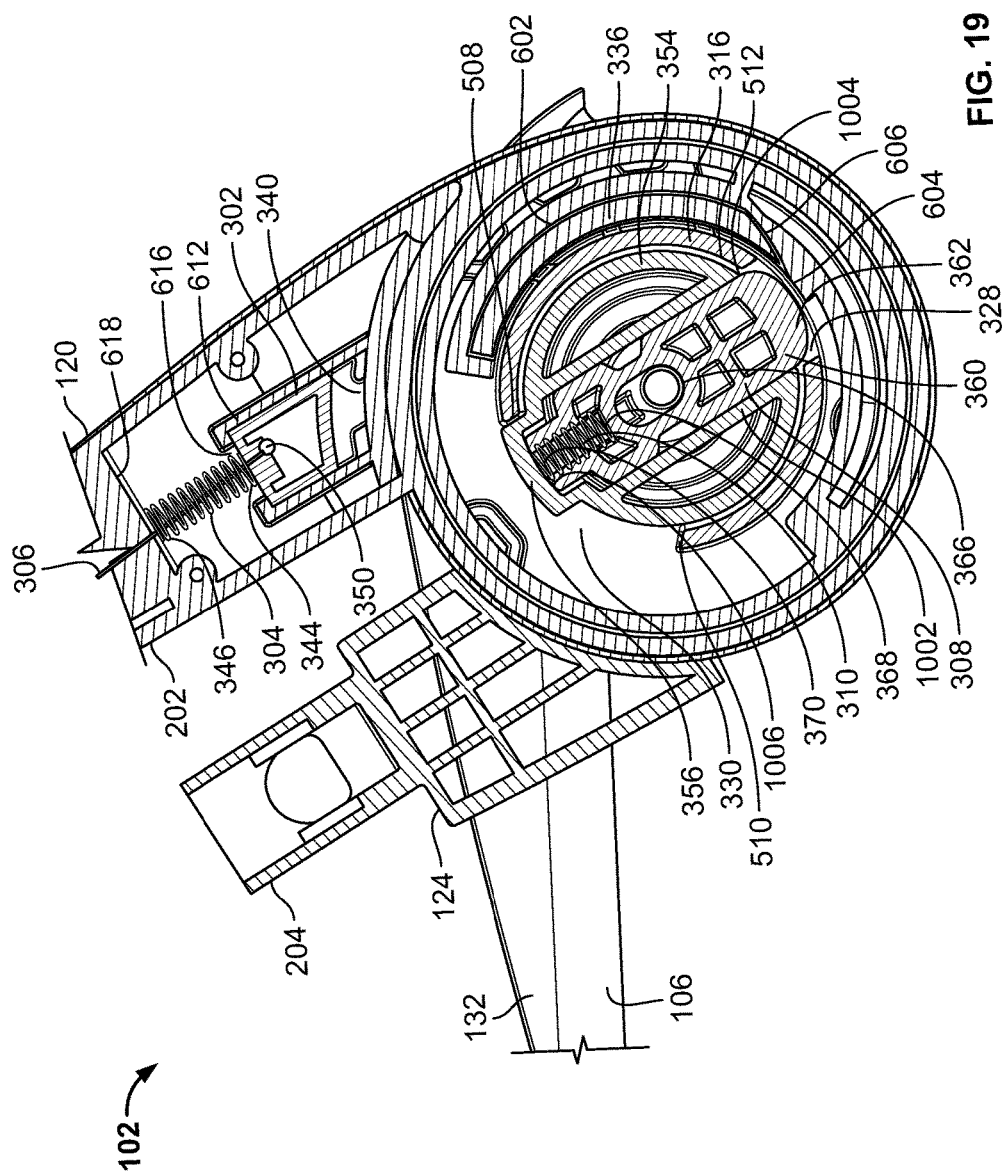
FIG. 19 is a partial cutaway view of the example recline assembly of FIGS. 1-4 and 12-18 in an eighth example position.

FIG. 19 is a partial cutaway view of the example recline assembly 102 of FIGS. 1-4 and 12-18 in an eighth example position. In the illustrated example of FIG. 19, the locking tooth 340 of the recline lock pin 302 remains in contact with the third portion 506 of the outer lock position ring 314 of the seat base 106, as described above in connection with FIG. 18. Accordingly, the locking tooth 340 remains disengaged from the third lock position 324 of the outer lock position ring 314 of the seat base 106, and the seat back connector 120 remains free to rotate between a third recline position corresponding to the third lock position 322 of the outer lock position ring 314 of the seat base 106 and a folded position corresponding to the fourth lock position 326 of the outer lock position ring 314 of the seat base 106. In the illustrated example of FIG. 19, the position of the seat back connector 120 has changed relative to the example position of the seat back connector 120 described above in connection with FIG. 18. In the illustrated example of FIG. 19, the arm portion 202 of the seat back connector 120 is rotated forward (e.g., toward the front end 128 of the seat base 106) relative to the example position of the arm portion 202 of the seat back connector 120 shown in FIG. 18.

In the illustrated example of FIG. 19, the position of the napper bar lock pin 308 within the napper bar lock pin track 1002 of the napper bar connector 124 has changed relative to the example position of the napper bar lock pin 308 described above in connection with FIGS. 12-18. The cam surface follower 362 of the napper bar lock pin 308 has been lifted and/or raised via the ramped segment 606 of the cam surface 336 of the seat back connector 120 such that the cam surface follower 362 is in contact with and/or adjacent to the inner segment 604 (as opposed to the outer segment 602) of the cam surface 336. When the seat back connector 120 and the napper bar connector 124 are positioned as shown in FIG. 19, the locking portion 360 of the napper bar lock pin 308 is disengaged and/or unlocked from the lock position 328 of the inner lock position ring 316 of the seat base 106 such that the guide ring 354 of the napper bar connector 124 and/or, more generally, the napper bar connector 124 is/are free to rotate relative to the seat base 106. The angular range over which the guide ring 354 of the napper bar connector 124 and/or, more generally, the napper bar connector 124 is free to rotate relative to the seat base 106 is limited by the extension of the guide ring tooth 356 into the guide ring tooth opening 330 of the inner lock position ring 316 of the seat base 106. In the illustrated example of FIG. 19, the guide ring tooth 356 is free to rotate within the guide ring tooth opening 330 between the first end 508 and the second end 510 of the guide ring tooth opening 330.

Figure 20:
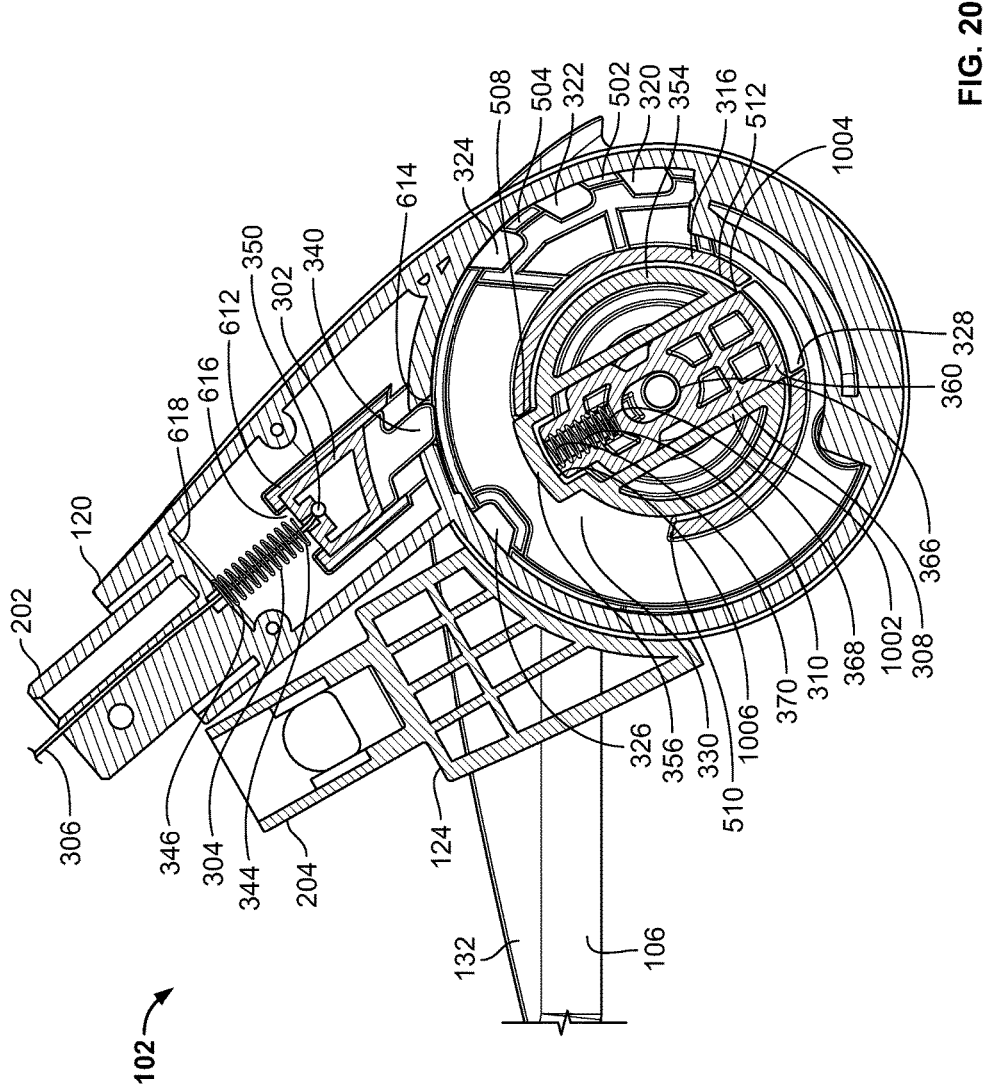
FIG. 20 is a partial cutaway view of the example recline assembly of FIGS. 1-4 and 12-19 in a ninth example position.

FIG. 20 is a partial cutaway view of the example recline assembly 102 of FIGS. 1-4 and 12-19 in a ninth example position. In the illustrated example of FIG. 20, the locking tooth 340 of the recline lock pin 302 remains in contact with the third portion 506 of the outer lock position ring 314 of the seat base 106, as described above in connection with FIGS. 18 and 19. Accordingly, the locking tooth 340 remains disengaged from the third lock position 324 of the outer lock position ring 314 of the seat base 106, and the seat back connector 120 remains free to rotate between a third recline position corresponding to the third lock position 322 of the outer lock position ring 314 of the seat base 106 and a folded position corresponding to the fourth lock position 326 of the outer lock position ring 314 of the seat base 106. In the illustrated example of FIG. 20, the position of the seat back connector 120 has changed relative to the example position of the seat back connector 120 described above in connection with FIG. 19. In the illustrated example of FIG. 20, the arm portion 202 of the seat back connector 120 is rotated forward (e.g., toward the front end 128 of the seat base 106) relative to the example position of the arm portion 202 of the seat back connector 120 shown in FIG. 19, such that the arm portion 202 of the seat back connector 120 contacts the arm portion 204 of the napper bar connector 124.

In the illustrated example of FIG. 20, the position of the napper bar lock pin 308 remains unchanged relative to the example position of the napper bar lock pin 308 described above in connection with FIG. 19. Thus, the cam surface follower 362 of the napper bar lock pin 308 remains in contact with and/or adjacent to the inner segment 604 of the cam surface 336 of the seat back connector 120, the locking portion 360 of the napper bar lock pin 308 remains disengaged from the lock position 328 of the inner lock position ring 316 of the seat base 106, and the napper bar connector 124 remains free to rotate relative to the seat base 106.

Figure 21:
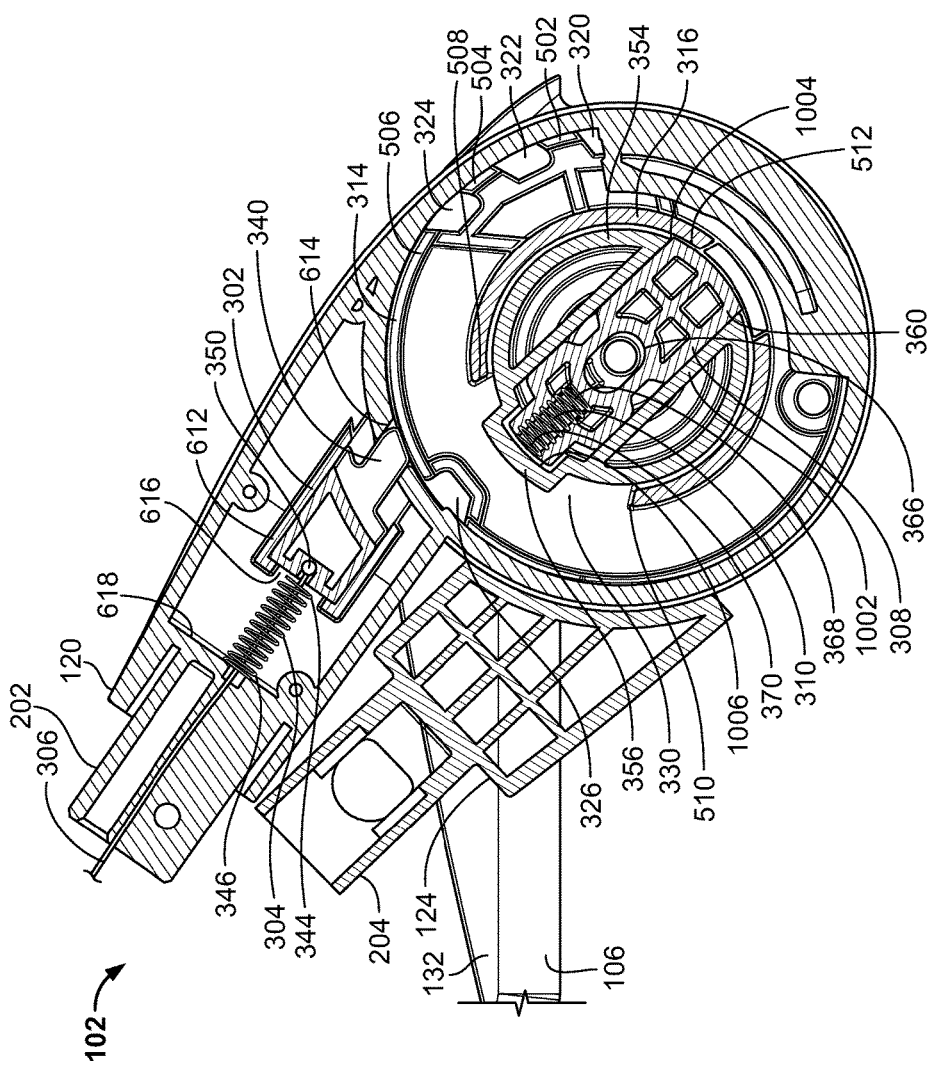
FIG. 21 is a partial cutaway view of the example recline assembly of FIGS. 1-4 and 12-20 in a tenth example position.

FIG. 21 is a partial cutaway view of the example recline assembly 102 of FIGS. 1-4 and 12-20 in a tenth example position. In the illustrated example of FIG. 21, the locking tooth 340 of the recline lock pin 302 remains in contact with the third portion 506 of the outer lock position ring 314 of the seat base 106, as described above in connection with FIGS. 18-20. Accordingly, the locking tooth 340 remains disengaged from the third lock position 324 of the outer lock position ring 314 of the seat base 106, and the seat back connector 120 remains free to rotate between a third recline position corresponding to the third lock position 322 of the outer lock position ring 314 of the seat base 106 and a folded position corresponding to the fourth lock position 326 of the outer lock position ring 314 of the seat base 106. In the illustrated example of FIG. 21, the position of the seat back connector 120 has changed relative to the example position of the seat back connector 120 described above in connection with FIG. 20. In the illustrated example of FIG. 21, the arm portion 202 of the seat back connector 120 is rotated forward (e.g., toward the front end 128 of the seat base 106) relative to the example position of the arm portion 202 of the seat back connector 120 shown in FIG. 20. In the illustrated example of FIG. 21, the arm portion 202 of the seat back connector 120 contacts the arm portion 204 of the napper bar connector 124.

In the illustrated example of FIG. 21, the position of the napper bar connector 124 has changed relative to the example position of the napper bar connector 124 described above in connection with FIG. 20. In the illustrated example of FIG. 21, the arm portion 204 of the napper bar connector 124 is rotated forward (e.g., toward the front end 128 of the seat base 106) relative to the example position of the arm portion 204 of the napper bar connector 124 shown in FIG. 20. In the illustrated example of FIG. 21, the guide ring tooth 356 of the guide ring 354 of the napper bar connector 124 extends into the guide ring tooth opening 330 of the inner lock position ring 316 of the seat base 106 and is positioned approximately midway between the first end 508 and the second end 510 of the guide ring tooth opening 330.

In the illustrated example of FIG. 21, the locking portion 360 of the napper bar lock pin 308 contacts the first portion 512 of the inner lock position ring 316 of the seat base 106 located between the lock position 328 of the inner lock position ring 316 and the guide ring tooth opening 330 of the inner lock position ring 316. When the locking portion 360 of the napper bar lock pin 308 contacts the first portion 512 of the inner lock position ring 316 (as shown in FIG. 21), the first portion 512 of the inner lock position ring 316 forces and/or holds the napper bar lock pin 308 in a disengaged position without requiring that the cam surface follower 362 of the napper bar lock pin 308 be in contact with and/or adjacent to the inner segment 604 of the cam surface 336 of the seat back connector 120. When the seat back connector 120 and the napper bar connector 124 are positioned as shown in FIG. 21, the cam surface follower 362 of the napper bar lock pin 308 contacts and/or is adjacent to the inner segment 604 of the cam surface 336 of the seat back connector 120, the locking portion 360 of the napper bar lock pin 308 is disengaged from the lock position 328 of the inner lock position ring 316 of the seat base 106 and is in contact with the first portion 512 of the inner lock position ring 316, and the napper bar connector 124 is free to rotate relative to the seat base 106.

Figure 22:
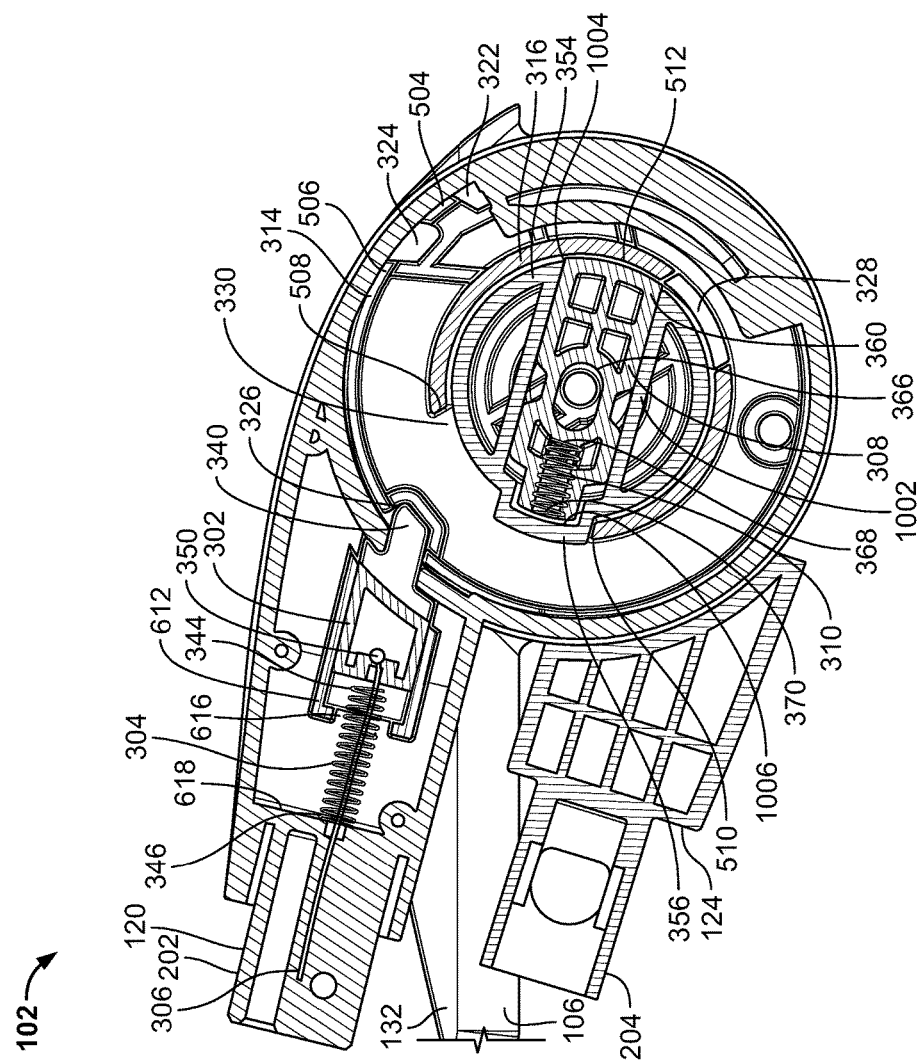
FIG. 22 is a first partial cutaway view of the example recline assembly of FIGS. 1-4 and 12-21 in an eleventh example position.
Figure 23:
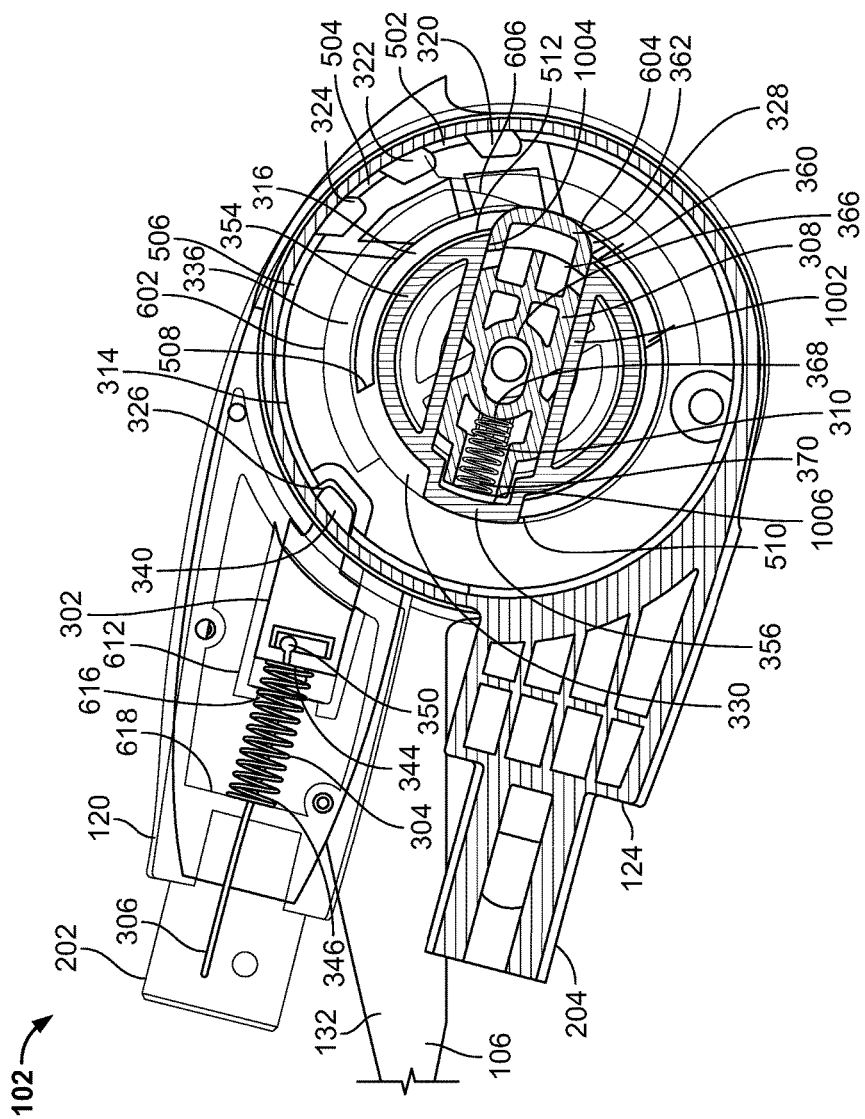
FIG. 23 is a second partial cutaway view of the example recline assembly of FIGS. 1-4 and 12-22 in the eleventh example position.

FIG. 22 is a first partial cutaway view of the example recline assembly 102 of FIGS. 1-4 and 12-21 in an eleventh example position. FIG. 23 is a second partial cutaway view of the example recline assembly 102 of FIGS. 1-4 and 12-22 in the eleventh example position. The position of the seat back connector 120 has changed relative to the example position of the seat back connector 120 described above in connection with FIG. 21. In the illustrated example of FIGS. 22 and 23, the arm portion 202 of the seat back connector 120 is rotated forward (e.g., toward the front end 128 of the seat base 106) relative to the example position of the arm portion 202 of the seat back connector 120 shown in FIG. 21. The locking tooth 340 of the recline lock pin 302 extends through the locking tooth notch 614 of the seat back connector 120 and is engaged with the fourth lock position 326 of the outer lock position ring 314 of the seat base 106. The engagement of the locking tooth 340 of the recline lock pin 302 with the fourth lock position 326 of the outer lock position ring 314 of the seat base 106 locks the seat back connector 120 such that the seat back connector 120 is unable to rotate relative to the seat base 106. In the illustrated example of FIGS. 22 and 23, the arm portion 202 of the seat back connector 120 is positioned at an angle of approximately zero degrees (0°) relative to arm portion 204 of the napper bar connector 124.

In the illustrated example of FIGS. 22 and 23, the position of the napper bar connector 124 has changed relative to the example position of the napper bar connector 124 described above in connection with FIG. 21. In the illustrated example of FIGS. 22 and 23, the arm portion 204 of the napper bar connector 124 is rotated forward (e.g., toward the front end 128 of the seat base 106) relative to the example position of the arm portion 204 of the napper bar connector 124 shown in FIG. 21. The guide ring tooth 356 of the guide ring 354 of the napper bar connector 124 extends into the guide ring tooth opening 330 of the inner lock position ring 316 of the seat base 106 and is positioned adjacent the second end 510 of the guide ring tooth opening 330. In the illustrated example of FIGS. 22 and 23, the inner segment 604 of the cam surface 336 of the seat back connector 120 extends across the lock position 328 of the inner lock position ring 316 of the seat base 106. When the seat back connector 120 and the napper bar connector 124 are positioned as shown in FIGS. 22 and 23, the cam surface follower 362 of the napper bar lock pin 308 contacts and/or is adjacent to the inner segment 604 of the cam surface 336 of the seat back connector 120, the locking portion 360 of the napper bar lock pin 308 is disengaged from the lock position 328 of the inner lock position ring 316 of the seat base 106 and is in contact with the first portion 512 of the inner lock position ring 316, and the napper bar connector 124 is free to rotate relative to the seat base 106.

Figure 24:
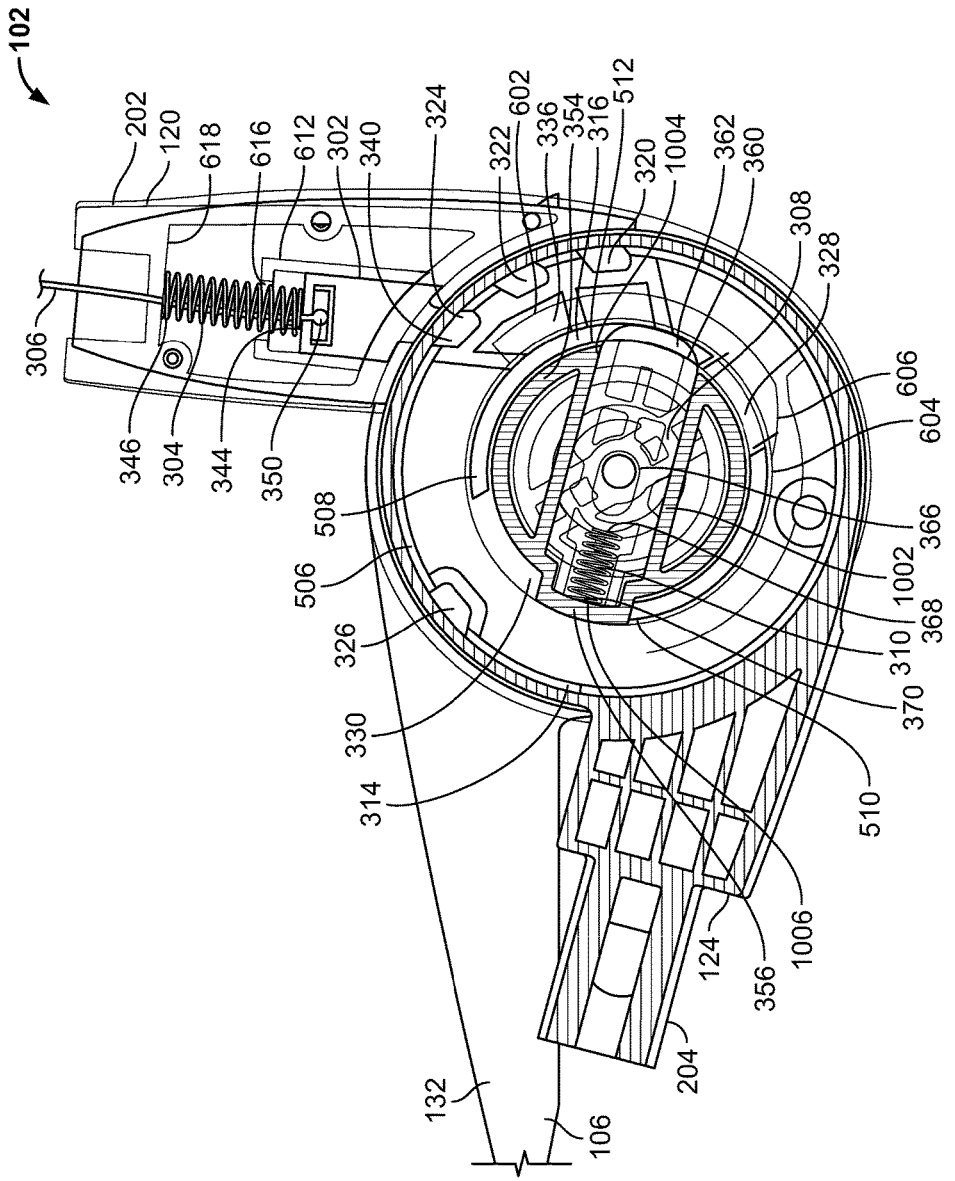
FIG. 24 is a partial cutaway view of the example recline assembly of FIGS. 1-4 and 12-23 in a twelfth example position.

FIG. 24 is a partial cutaway view of the example recline assembly 102 of FIGS. 1-4 and 12-23 in a twelfth example position. The position of the seat back connector 120 has changed relative to the example position of the seat back connector 120 described above in connection with FIGS. 22 and 23. In the illustrated example of FIG. 24, the arm portion 202 of the seat back connector 120 is rotated rearward (e.g., away from the front end 128 of the seat base 106) relative to the example position of the arm portion 202 of the seat back connector 120 shown in FIGS. 22 and 23. The locking tooth 340 of the recline lock pin 302 extends through the locking tooth notch 614 of the seat back connector 120 and is engaged with the third lock position 324 of the outer lock position ring 314 of the seat base 106. The engagement of the locking tooth 340 of the recline lock pin 302 with the third lock position 324 of the outer lock position ring 314 of the seat base 106 locks the seat back connector 120 such that the seat back connector 120 is unable to rotate relative to the seat base 106. In the illustrated example of FIG. 24, the arm portion 202 of the seat back connector 120 is reclined and/or positioned at an angle of approximately one hundred degrees (100°) relative to seat base 106.

In the illustrated example of FIG. 24, the position of the napper bar connector 124 remains unchanged relative to the example position of the napper bar connector 124 described above in connection with FIGS. 22 and 23. Thus, the guide ring tooth 356 of the guide ring 354 of the napper bar connector 124 remains positioned adjacent the second end 510 of the guide ring tooth opening 330 of the inner lock position ring 316 of the seat base 106, the locking portion 360 of the napper bar lock pin 308 remains disengaged from the lock position 328 of the inner lock position ring 316 of the seat base 106 and in contact with the first portion 512 of the inner lock position ring 316, and the napper bar connector 124 remains free to rotate relative to the seat base 106. In the illustrated example of FIG. 24, the inner segment 604 of the cam surface 336 of the seat back connector 120 no longer extends across the lock position 328 of the inner lock position ring 316 of the seat base 106. Instead, the outer segment 602 of the cam surface 336 of the seat back connector 120 extends across the lock position 328 of the inner lock position ring 316 of the seat base 106.

Figure 25:
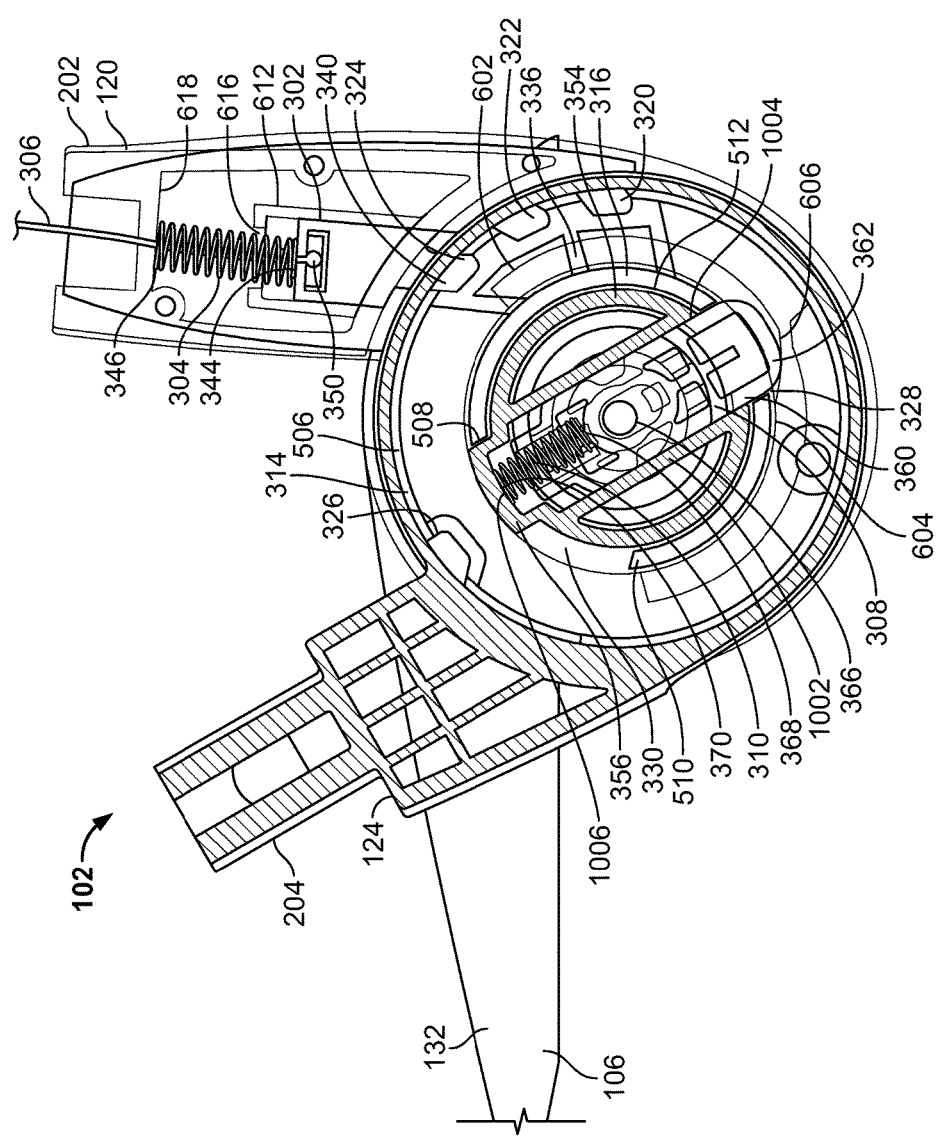
FIG. 25 is a partial cutaway view of the example recline assembly of FIGS. 1-4 and 12-24 in a thirteenth example position.

FIG. 25 is a partial cutaway view of the example recline assembly 102 of FIGS. 1-4 and 12-24 in a thirteenth example position. The thirteenth example position of the recline assembly 102 illustrated in FIG. 25 corresponds to the sixth example position of the recline assembly 102 illustrated in FIG. 17 and described above. In the illustrated example of FIG. 25, the position of the seat back connector 120 remains unchanged relative to the example position of the seat back connector 120 described above in connection with FIG. 24. Thus, the locking tooth 340 of the recline lock pin 302 remains engaged with the third lock position 324 of the outer lock position ring 314 of the seat base 106, and the seat back connector 120 remains locked and/or unable to rotate relative to the seat base 106. In the illustrated example of FIG. 25, the arm portion 202 of the seat back connector 120 is reclined and/or positioned at an angle of approximately one hundred degrees (100°) relative to seat base 106.

In the illustrated example of FIG. 25, the position of the napper bar connector 124 has changed relative to the example position of the napper bar connector 124 described above in connection with FIGS. 22-24. In the illustrated example of FIG. 25, the arm portion 204 of the napper bar connector 124 is rotated rearward (e.g., away from the front end 128 of the seat base 106) relative to the example position of the arm portion 204 of the napper bar connector 124 shown in FIGS. 22-24. The guide ring tooth 356 of the guide ring 354 of the napper bar connector 124 extends into the guide ring tooth opening 330 of the inner lock position ring 316 of the seat base 106 and is positioned adjacent the first end 508 of the guide ring tooth opening 330. The locking portion 360 of the napper bar lock pin 308 extends through the guide ring notch 1004 of the guide ring 354 of the napper bar connector 124 and through the lock position 328 of the inner lock position ring 316 of the seat base 106 such that the locking portion 360 of the napper bar lock pin 308 is engaged with the lock position 328 of the inner lock position ring 316 of the seat base 106. The engagement of the locking portion 360 of the napper bar lock pin 308 with the lock position 328 of the inner lock position ring 316 of the seat base 106 locks the napper bar connector 124 such that the napper bar connector 124 is unable to rotate relative to the seat base 106. When the seat back connector 120 and the napper bar connector 124 are positioned as shown in FIG. 25, the cam surface follower 362 of the napper bar lock pin 308 contacts and/or is adjacent to the outer segment 602 of the cam surface 336 of the seat back connector 120.

The progression of positions and/or movements of the seat back connector 120, the napper bar connector 124, the recline lock pin 302, the napper bar lock pin 308, the guide ring 354 and the guide ring tooth 356 as described above in connection with FIGS. 17-23 corresponds to an example method of folding the stroller seat 100 including the recline assembly 102 from the unfolded position shown in FIG. 1 to the folded position shown in FIG. 2. The progression of positions and/or movements of the seat back connector 120, the napper bar connector 124, the recline lock pin 302, the napper bar lock pin 308, the guide ring 354 and the guide ring tooth 356 as described above in connection with FIGS. 22-25 corresponds to an example method of unfolding the stroller seat 100 including the recline assembly 102 from the folded position shown in FIG. 2 to the unfolded position shown in FIG. 1.

From the foregoing, it will be appreciated that the disclosed stroller seat recline assemblies provide numerous advantages over conventional stroller seat recline assemblies. Unlike conventional stroller seats having napper bars that are fixed relative to the seat base, or napper bars that are movable relative to the seat base only by way of mechanisms independent from a recline mechanism that enables movement of a seat back of the stroller seat relative to the seat base, the stroller seats disclosed herein include recline assemblies that enable rotation of a seat back as well as a napper bar toward a seat base of the stroller seat. Implementation of the disclosed recline assemblies enables a stroller seat to be folded into a compact structure without an operator of the stroller seat having to separately actuate independent mechanisms to rotate the seat back and the napper bar of the stroller seat into a folded position. Accordingly, the disclosed recline assemblies advantageously simplify the process of folding a stroller seat having a seat back and a napper bar. The disclosed recline assemblies also advantageously reduce the time that would otherwise be consumed by the operator having to separately actuate independent mechanisms to rotate the seat back and the napper bar of the stroller seat into a folded position.

The advantages and/or benefits described above are achieved via the disclosed stroller seat recline assemblies. In some disclosed examples, a recline assembly for a stroller seat comprises a seat base, a seat back connector rotatably coupled to the seat base, and a napper bar connector rotatably coupled to the seat base. In some disclosed examples, the napper bar connector is releasable from a locked position in response to rotation of the seat back connector relative to the seat base. In some disclosed examples, the napper bar connector is rotatable relative to the seat base in response to being released from the locked position.

In some disclosed examples, the seat back connector is rigidly coupled to a seat back of the stroller seat. In some disclosed examples, the seat back is to rotate relative to the seat base in response to a corresponding rotation of the seat back connector relative to the seat base. In some disclosed examples, the napper bar connector is detachably coupled to a napper bar of the stroller seat. In some disclosed examples, the napper bar is to rotate relative to the seat base in response to a corresponding rotation of the napper bar connector relative to the seat base. In some disclosed examples, the seat back connector and the napper bar connector are rotatable relative to the seat base about an axis of rotation. In some disclosed examples, the seat back connector includes an arm portion and the napper bar connector includes an arm portion. In some disclosed examples, the recline assembly is movable to a folded position in which the arm portion of the seat back connector is generally parallel to the arm portion of the napper bar connector.

In some disclosed examples, the seat base includes an outer lock position ring having a plurality of lock positions. In some disclosed examples, respective ones of the lock positions of the outer lock position ring are engageable by the seat back connector to lock the position of the seat back connector relative to the seat base. In some disclosed examples, the seat back connector includes a recline lock pin to selectively engage one of the plurality of lock positions of the outer lock position ring. In some disclosed examples, the seat back connector includes a recline lock pin track. In some disclosed examples, the recline lock pin is positioned in the recline lock pin track and is movable between an engaged position in which the recline lock pin engages one of the plurality of lock positions of the outer lock position ring and a disengaged position in which the recline lock pin does not engage any of the plurality of lock positions of the outer lock position ring.

In some disclosed examples, the recline assembly includes a recline cable and an actuation assembly. In some disclosed examples, the recline cable is operatively coupled to the recline lock pin and the actuation assembly. In some disclosed examples, the actuation assembly includes an actuatable lever to increase the tension in the recline lock pin to move the recline lock pin from the engaged position to the disengaged position.

In some disclosed examples, the seat base includes an inner lock position ring having a lock position. In some disclosed examples, the lock position of the inner lock position ring is engageable by the napper bar connector to lock the position of the napper bar connector relative to the seat base. In some disclosed examples, the napper bar connector includes a napper bar lock pin to selectively engage the lock position of the inner lock position ring. In some disclosed examples, the napper bar connector includes a napper bar lock pin track. In some disclosed examples, the napper bar lock pin is positioned in the napper bar lock pin track and is movable between an engaged position in which the napper bar lock pin engages the lock position of the inner lock position ring and a disengaged position in which the napper bar lock pin does not engage the lock position of the inner lock position ring.

In some disclosed examples, the napper bar connector is releasable from the locked position in response to the napper bar lock pin being moved from the engaged position to the disengaged position. In some disclosed examples, the seat back connector includes a cam surface and the napper bar lock pin includes a cam surface follower. In some disclosed examples, the napper bar lock pin is moveable from the engaged position to the disengaged position in response to the cam surface follower contacting a ramped segment of the cam surface. In some disclosed examples, the cam surface follower is to contact the ramped segment of the cam surface in response to rotation of the seat back connector relative to the seat base when the napper bar connector is in the locked position.

In some disclosed examples, the napper bar connector includes a guide ring. In some disclosed examples, the napper bar lock pin track is positioned in the guide ring. In some disclosed examples, the guide ring is receivable in and rotatable relative to the inner lock position ring of the seat base. In some disclosed examples, the guide ring includes a guide ring tooth to extend into a guide ring tooth opening of the inner lock position ring. In some disclosed examples, the guide ring tooth opening defines a range of angular rotation of the napper bar connector relative to the seat base.

In some examples, a method for folding a stroller seat having a recline assembly is disclosed. In some disclosed examples, the method comprises disengaging a seat back connector of the recline assembly from a first locked position corresponding to a recline position of the stroller seat. In some disclosed examples, the method comprises rotating the seat back connector relative to a seat base of the stroller seat to disengage a napper bar connector of the recline assembly from a second locked position. In some disclosed examples, the method comprises, in response to disengaging the napper bar connector from the second locked position, rotating the seat back connector and the napper bar connector relative to the seat base to engage the seat back connector in a third locked position corresponding to a folded position of the stroller seat.

In some disclosed examples of the method, the seat back connector includes an arm portion rigidly coupled to a seat back of the stroller seat. In some disclosed examples of the method, the napper bar connector includes an arm portion detachably coupled to a napper bar of the stroller seat. In some disclosed examples of the method, the arm portion of the seat back connector is generally parallel to the arm portion of the napper bar connector when the stroller seat is in the folded position.

In some disclosed examples of the method, disengaging the seat back connector includes moving a recline lock pin positioned in a recline lock position track of the seat back connector from an engaged position in which the recline lock pin is engaged with one of a plurality of lock positions of an outer lock position ring of the seat base to a disengaged position in which the recline lock pin is not engaged with any of the plurality of lock positions of the outer lock position ring.

In some disclosed examples of the method, disengaging the napper bar connector includes moving a napper bar lock pin positioned in a napper bar lock pin track of the napper bar connector from an engaged position in which the napper bar lock pin is engaged with a lock position of an inner lock position ring of the seat base to a disengaged position in which the napper bar lock pin is not engaged with the lock position of the inner lock position ring. In some disclosed examples of the method, moving the napper bar lock pin from the engaged position to the disengaged position includes guiding a cam surface follower of the napper bar lock pin along a ramped segment of a cam surface of the seat back connector as the seat back connector is being rotated relative to the seat base.

Although certain example apparatus and methods have been disclosed herein, the scope of coverage of this patent is not limited thereto. On the contrary, this patent covers all apparatus and methods fairly falling within the scope of the claims of this patent.

What is claimed is:

1. A recline assembly for a stroller seat, the recline assembly comprising:
    a seat base including an outer lock position ring and an inner lock position ring positioned in the outer lock position ring, the outer lock position ring having a plurality of lock positions, the inner lock position ring having a lock position;
    a seat back connector rotatably coupled to the seat base, respective ones of the lock positions of the outer lock position ring being engageable by the seat back connector to lock the position of the seat back connector relative to the seat base; and
    a napper bar connector rotatably coupled to the seat base, the lock position of the inner lock position ring being engageable by the napper bar connector to lock the position of the napper bar connector relative to the seat base, the napper bar connector to be releasable from a locked position in response to rotation of the seat back connector relative to the seat base, the napper bar connector to be rotatable relative to the seat base in response to being released from the locked position.

2. The recline assembly of claim 1, wherein the seat back connector is rigidly coupled to a seat back of the stroller seat, the seat back to rotate relative to the seat base in response to a corresponding rotation of the seat back connector relative to the seat base.

3. The recline assembly of claim 1, wherein the napper bar connector is detachably coupled to a napper bar of the stroller seat, the napper bar to rotate relative to the seat base in response to a corresponding rotation of the napper bar connector relative to the seat base.

4. The recline assembly of claim 1, wherein the seat back connector and the napper bar connector are rotatable relative to the seat base about an axis of rotation.

5. The recline assembly of claim 1, wherein the seat back connector includes an arm portion, the napper bar connector includes a an arm portion, and the recline assembly is movable to a folded position in which the arm portion of the seat back connector is generally parallel to the arm portion of the napper bar connector.

6. The recline assembly of claim 1, wherein the seat back connector includes a recline lock pin to selectively engage one of the plurality of lock positions of the outer lock position ring.

7. The recline assembly of claim 6, wherein the seat back connector includes a recline lock pin track, the recline lock pin being positioned in the recline lock pin track and being movable between an engaged position in which the recline lock pin engages one of the plurality of lock positions of the outer lock position ring and a disengaged position in which the recline lock pin does not engage any of the plurality of lock positions of the outer lock position ring.

8. The recline assembly of claim 7, further including a recline cable and an actuation assembly, the recline cable being operatively coupled to the recline lock pin and the actuation assembly, the actuation assembly including an actuatable lever to increase the tension in the recline lock pin to move the recline lock pin from the engaged position to the disengaged position.

9. The recline assembly of claim 1, wherein the napper bar connector includes a napper bar lock pin to selectively engage the lock position of the inner lock position ring.

10. The recline assembly of claim 9, wherein the napper bar connector includes a napper bar lock pin track, the napper bar lock pin being positioned in the napper bar lock pin track and being movable between an engaged position in which the napper bar lock pin engages the lock position of the inner lock position ring and a disengaged position in which the napper bar lock pin does not engage the lock position of the inner lock position ring.

11. The recline assembly of claim 10, wherein the napper bar connector is releasable from the locked position in response to the napper bar lock pin being moved from the engaged position to the disengaged position.

12. The recline assembly of claim 10, wherein the seat beck connector includes a cam surface and the napper bar lock pin includes a cam surface follower, the napper bar lock pin to be moveable from the engaged position to the disengaged position in response to the cam surface follower contacting a ramped segment of the cam surface.

13. The recline assembly of claim 12, wherein the cam surface follower is to contact the ramped segment of the cam surface in response to rotation of the seat back connector relative to the seat base when the napper bar connector is in the locked position.

14. The recline assembly of claim 10, wherein the napper bar connector includes a guide ring, the napper bar lock pin track being positioned in the guide ring, the guide ring being receivable in and rotatable relative to the inner lock position ring of the seat base, the guide ring including a guide ring tooth to extend into a guide ring tooth opening of the inner lock position ring, the guide ring tooth opening to define a range of angular rotation of the napper bar connector relative to the seat base.

15. A recline assembly for a stroller seat, the recline assembly comprising:
  a seat base including an outer lock position ring and an inner lock position ring positioned in the outer lock position ring, the outer lock position ring having a plurality of lock positions engageable by a recline lock pin, the inner lock position ring having a lock position engageable by a napper bar lock pin;
  a seat back connector rotatably coupled to the seat base, the seat back connector including a recline lock pin track, the recline lock pin being positioned in the recline lock pin track and being movable between an engaged position in which the recline lock pin engages one of the plurality of lock positions of the outer lock position ring and a disengaged position in which the recline lock pin does not engage any of the plurality of lock positions of the outer lock position ring; and
  a napper bar connector rotatably coupled to the seat base, the napper bar connector including a napper bar lock pin track, the napper bar lock pin being positioned in the napper bar lock pin track and being movable between an engaged position in which the napper bar lock pin engages the lock position of the inner lock position ring and a disengaged position in which the napper bar lock pin does not engage the lock position of the inner lock position ring, the napper bar lock pin to be disengaged from the lock position of the inner lock position ring in response to rotation of the seat back connector relative to the seat base, the napper bar connector to be rotatable relative to the seat base in response to the napper bar lock pin being disengaged from the lock position of the inner lock position ring.

16. The recline assembly of claim 15, wherein the seat back connector includes a cam surface and the napper bar lock pin includes a cam surface follower, the napper bar lock pin to be moveable from the engaged position to the disengaged position in response to the cam surface follower contacting a ramped segment of the cam surface when the seat back connector is rotated relative to the seat base.

17. A method for folding a stroller seat having a recline assembly, the method comprising:
  disengaging a seat back connector of the recline assembly from a first one of a plurality of lock positions of an outer lock position ring of a seat base, the seat back connector being rotatably coupled to the seat base, the first one of the lock positions of the outer lock position ring corresponding to a recline position of the stroller seat;
  rotating the seat back connector relative to the seat base of the stroller seat to disengage a napper bar connector of the recline assembly from a lock position of an inner lock position ring of the seat base, the napper bar connector being rotatably coupled to the seat base, the inner lock position ring being positioned in the outer lock position ring; and
  in response to disengaging the napper bar connector from the lock position of the inner lock position ring, rotating the seat back connector and the napper bar connector relative to the seat base to engage the seat back connector in a second one of the lock positions of the outer lock position ring, the second one of the lock positions of the outer lock position ring corresponding to a folded position of the stroller seat.

18. The method of claim 17, wherein the napper bar connector includes a napper bar lock pin, a napper bar lock pin track, and a guide ring, the napper bar lock pin being positioned in the napper bar lock pin track and being movable between an engaged position in which the napper bar lock pin engages the lock position of the inner lock position ring and a disengaged position in which the napper bar lock pin does not engage the lock position of the inner lock position ring, the napper bar lock pin track being positioned in the guide ring, the guide ring being receivable in and rotatable relative to the inner lock position ring of the seat base, the guide ring including a guide ring tooth to extend into a guide ring tooth opening of the inner lock position ring, the guide ring tooth opening to define a range of angular rotation of the napper bar connector relative to the seat base.

19. The method of claim 17, wherein the seat back connector includes an arm portion rigidly coupled to a seat back of the stroller seat, the napper bar connector includes an arm portion detachably coupled to a napper bar of the stroller seat, and the arm portion of the seat back connector is generally parallel to the arm portion of the napper bar connector when the stroller seat is in the folded position.

20. The recline assembly of claim 15, wherein the napper bar connector includes a guide ring, the napper bar lock pin track being positioned in the guide ring, the guide ring being receivable in and rotatable relative to the inner lock position ring of the seat base, the guide ring including a guide ring tooth to extend into a guide ring tooth opening of the inner lock position ring, the guide ring tooth opening to define a range of angular rotation of the napper bar connector relative to the seat base.

\* \* \* \* \*

UNITED STATES PATENT AND TRADEMARK OFFICE
CERTIFICATE OF CORRECTION

PATENT NO. : 9,962,011 B1
APPLICATION NO. : 15/417886
DATED : May 8, 2018
INVENTOR(S) : Mark Eyman It is certified that error appears in the above-identified patent and that said Letters Patent is hereby corrected as shown below:

In the Claims

Column 29, Line 55 (Claim 12): Replace "beck" with --back--.

Signed and Sealed this
Sixteenth Day of October, 2018

Andrei Iancu
*Director of the United States Patent and Trademark Office*